United States Patent
Gross et al.

(10) Patent No.: US 11,485,673 B2
(45) Date of Patent: Nov. 1, 2022

(54) GLASSES WITH IMPROVED TEMPERING CAPABILITIES

(71) Applicant: CORNING INCORPORATED, Corning, NY (US)

(72) Inventors: Timothy Michael Gross, Corning, NY (US); Peter Joseph Lezzi, Corning, NY (US); Jingshi Wu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 224 days.

(21) Appl. No.: 16/640,993

(22) PCT Filed: Aug. 24, 2018

(86) PCT No.: PCT/US2018/047859
§ 371 (c)(1),
(2) Date: Feb. 21, 2020

(87) PCT Pub. No.: WO2019/040818
PCT Pub. Date: Feb. 28, 2019

(65) Prior Publication Data
US 2021/0122665 A1   Apr. 29, 2021

Related U.S. Application Data (60) Provisional application No. 62/549,507, filed on Aug. 24, 2017.

(51) Int. Cl.
*C03C 3/091*  (2006.01)
*C03C 3/087*  (2006.01)
*C03C 4/02*   (2006.01)
*C03B 27/04*  (2006.01)

(52) U.S. Cl.
CPC .......... *C03C 3/091* (2013.01); *C03B 27/0413* (2013.01); *C03C 3/087* (2013.01); *C03C 4/02* (2013.01); *C03C 2204/00* (2013.01)

(58) Field of Classification Search
CPC .......... C03C 3/091; C03C 3/087; C03C 4/02; C03C 2204/00; C03C 3/076; C03C 3/089; C03B 27/0413
See application file for complete search history.

(56) References Cited

U.S. PATENT DOCUMENTS

| | | |
|---|---|---|
| 2,145,119 A | 1/1939 | Littleton |
| 2,177,336 A | 10/1939 | Shaver et al. |
| 3,107,196 A | 10/1963 | Acloque |
| 3,169,900 A | 2/1965 | Ermlich |
| 3,174,839 A | 3/1965 | Long |
| 3,223,499 A | 12/1965 | Cypher et al. |
| 3,223,501 A | 12/1965 | Fredley et al. |
| 3,223,549 A | 12/1965 | Fredley et al. |
| 3,225,349 A | 12/1965 | Thor |
| 3,279,906 A | 10/1966 | Baker |
| 3,293,015 A | 12/1966 | Fredley et al. |
| 3,332,759 A | 7/1967 | McMaster et al. |
| 3,374,078 A | 3/1968 | Wright |
| 3,409,422 A | 11/1968 | Gulotta |
| 3,449,102 A | 6/1969 | Nedelec et al. |
| 3,497,340 A | 2/1970 | Dennison et al. |
| 3,558,415 A | 1/1971 | Rieser et al. |
| 3,637,453 A | 1/1972 | Simmons |
| 3,673,049 A | 6/1972 | Giffen et al. |
| 3,679,388 A | 7/1972 | Giddings et al. |
| 3,744,921 A | 7/1973 | Weller et al. |
| 3,753,674 A | 8/1973 | Ohlberg et al. |
| 3,776,712 A | 12/1973 | Wilde |
| 3,793,127 A | 2/1974 | Wartenberg |
| 3,794,476 A | 2/1974 | Michalik et al. |
| 3,830,540 A | 8/1974 | Sperry |
| 3,844,758 A | 10/1974 | Wartenberg |
| 3,883,339 A | 5/1975 | Michalik et al. |
| 3,890,128 A | 6/1975 | Melling et al. |
| 3,902,884 A | 9/1975 | Harrison |
| 3,929,442 A | 12/1975 | Neely, Jr. |
| 3,931,438 A | 1/1976 | Beall et al. |
| 3,936,291 A | 2/1976 | McMaster |
| 3,973,943 A | 8/1976 | Seymour |
| 3,994,711 A | 11/1976 | McMaster |
| 4,081,254 A | 3/1978 | Matsumoto et al. |
| 4,128,690 A | 12/1978 | Boardman et al. |
| 4,194,898 A | 3/1980 | Marsh et al. |
| 4,198,226 A | 4/1980 | Marsh et al. |
| 4,198,463 A | 4/1980 | Greenhalgh |

(Continued)

FOREIGN PATENT DOCUMENTS

| | | |
|---|---|---|
| AU | 42657/72 A | 11/1973 |
| AU | 05245/73 B2 | 9/1982 |

(Continued)

OTHER PUBLICATIONS

JP2001180967 translation (Year: 2001).*
WO200134531 translation (Year: 2001).*
Chinese Patent Application No. 201880054891.5, Office Action dated Dec. 15, 2021, 13 pages (8 pages of English Translation and 5 pages of Original Document), Chinese Patent Office.
Barsom; "Fracture of Tempered Glass"; J. Am. Ceram. Soc., 51[2] 75-78 (1968).
Gardon; "Thermal Tempering of Glass"; pp. 146-216 in Glass: Science and Technology, vol. 5, Elasticity and Strentth in Glasses, Ed. by D.R. Uhlmann and N.J. Kreidl, Academic Press, New York, 1980.
Gulati, "Frangibility of Tempered Soda-Lime Glass Sheet," pp. 13-15 in Glass Performance Days, 1997.

(Continued)

*Primary Examiner* — Karle Group
*Assistant Examiner* — Cameron K Miller
(74) *Attorney, Agent, or Firm* — Russell Magaziner (57) ABSTRACT

The disclosure relates to glass compositions having improved thermal tempering capabilities. The disclosed glass compositions have high coefficients of thermal expansion and Young's moduli, and are capable of achieving high surface compressions. A method of making such glasses is also provided.

17 Claims, 1 Drawing Sheet

(56) References Cited

U.S. PATENT DOCUMENTS

| | | |
|---|---|---|
| 4,204,845 A | 5/1980 | Shields et al. |
| 4,214,886 A | 7/1980 | Shay et al. |
| 4,300,936 A | 11/1981 | Quillevere et al. |
| 4,314,836 A | 2/1982 | Seymour |
| 4,319,907 A | 3/1982 | Pike |
| 4,372,774 A | 2/1983 | Cross et al. |
| 4,400,193 A | 8/1983 | Cross et al. |
| 4,470,838 A | 9/1984 | McMaster et al. |
| 4,471,024 A | 9/1984 | Pargamin et al. |
| 4,494,972 A | 1/1985 | Marsh et al. |
| 4,516,999 A | 5/1985 | Kiefer et al. |
| 4,662,926 A | 5/1987 | Aratani et al. |
| 4,744,676 A | 5/1988 | Lind |
| 4,773,926 A | 9/1988 | Letemps et al. |
| 4,913,720 A | 4/1990 | Gardon et al. |
| 5,009,694 A | 4/1991 | Nishitani et al. |
| 5,071,796 A | 12/1991 | Jones et al. |
| 5,121,329 A | 6/1992 | Crump |
| 5,236,488 A | 8/1993 | Vehmas |
| 5,340,433 A | 8/1994 | Crump |
| 5,626,911 A | 5/1997 | Bertin et al. |
| 5,654,057 A | 8/1997 | Kitayama et al. |
| 5,676,722 A | 10/1997 | Seidel et al. |
| 5,735,923 A | 4/1998 | Hisaeda |
| 5,885,316 A | 3/1999 | Sato et al. |
| 5,931,981 A | 8/1999 | McMaster et al. |
| 5,938,808 A | 8/1999 | McMaster et al. |
| 6,053,011 A | 4/2000 | Lisec |
| 6,079,227 A | 6/2000 | Yoshizawa et al. |
| 6,094,943 A | 8/2000 | Okuda et al. |
| 6,183,565 B1 | 2/2001 | Granneman et al. |
| 6,200,665 B1 | 3/2001 | Seto |
| 6,295,842 B1 | 10/2001 | McMaster |
| 6,336,775 B1 | 1/2002 | Morita et al. |
| 6,353,283 B1 | 3/2002 | Ghosh et al. |
| 6,370,917 B1 | 4/2002 | Kato et al. |
| 6,412,309 B1 | 7/2002 | Kajii et al. |
| 6,442,017 B1 | 8/2002 | Ewing et al. |
| 6,461,439 B1 | 10/2002 | Granneman et al. |
| 6,472,800 B2 | 10/2002 | Goda et al. |
| 6,598,427 B1 | 7/2003 | Douche et al. |
| 6,613,685 B1 | 9/2003 | Granneman et al. |
| 6,642,017 B2 | 11/2003 | Weiser |
| 6,656,597 B2 | 12/2003 | Takahara |
| 6,713,180 B1 | 3/2004 | Torr et al. |
| 6,722,160 B1 | 4/2004 | Nemugaki et al. |
| 6,770,851 B2 | 8/2004 | Granneman et al. |
| 6,805,749 B2 | 10/2004 | Granneman et al. |
| 6,826,929 B2 | 12/2004 | Boaz |
| 6,877,250 B2 | 4/2005 | Granneman et al. |
| 6,881,485 B2 | 4/2005 | Kato et al. |
| 6,881,931 B2 | 4/2005 | Vehmas et al. |
| 6,977,710 B2 | 12/2005 | Akiyama et al. |
| 7,022,627 B2 | 4/2006 | Granneman et al. |
| 7,048,488 B1 | 5/2006 | Kuznetsov et al. |
| 7,153,798 B2 | 12/2006 | Bordeaux et al. |
| 7,215,262 B2 | 5/2007 | Suzuki et al. |
| 7,306,848 B2 | 12/2007 | Tominaga et al. |
| 7,312,156 B2 | 12/2007 | Granneman et al. |
| 7,341,968 B2 | 3/2008 | Yoda et al. |
| 7,367,205 B1 | 5/2008 | Boaz |
| 7,410,355 B2 | 8/2008 | Granneman et al. |
| 7,666,511 B2 | 2/2010 | Ellison et al. |
| 7,694,532 B1 | 4/2010 | Boaz |
| 7,867,932 B2 | 1/2011 | Beall |
| 8,074,473 B2 | 12/2011 | Nitschke et al. |
| 8,233,433 B2 | 7/2012 | Kalhan |
| 8,234,883 B2 | 8/2012 | Krall et al. |
| 8,289,342 B2 | 10/2012 | Matsumoto |
| 8,415,013 B2 | 4/2013 | Barefoot et al. |
| 8,524,804 B2 | 9/2013 | Kitano et al. |
| 8,713,967 B2 | 5/2014 | Danielson et al. |
| 8,713,972 B2 | 5/2014 | Lakota et al. |
| 8,728,961 B2 | 5/2014 | Lautenschlaeger et al. |
| 8,769,990 B2 | 7/2014 | Saito et al. |
| 8,916,013 B2 | 12/2014 | Hong et al. |
| 8,997,521 B2 | 4/2015 | Vehmas et al. |
| 9,003,835 B2 | 4/2015 | Lock |
| 9,039,886 B2 | 5/2015 | Gong et al. |
| 9,073,291 B2 | 7/2015 | Bookbinder et al. |
| 9,137,892 B2 | 9/2015 | Bando et al. |
| 9,296,638 B2 | 3/2016 | Lezzi et al. |
| 9,478,449 B2 | 10/2016 | Vermont et al. |
| 9,522,836 B2 | 12/2016 | Gulati et al. |
| 9,552,836 B2 | 1/2017 | Ramakrishnan et al. |
| 9,725,359 B2 | 8/2017 | Weber |
| 9,761,828 B2 | 9/2017 | Dabich et al. |
| 9,776,905 B2 | 10/2017 | Maschmeyer et al. |
| 9,783,448 B2 | 10/2017 | Maschmeyer et al. |
| 9,802,853 B2 | 10/2017 | Maschmeyer et al. |
| 10,150,699 B2 | 12/2018 | Baum, Jr. et al. |
| 10,195,778 B2 | 2/2019 | Wolf et al. |
| 2001/0007723 A1 | 7/2001 | Tokumoto |
| 2003/0177790 A1 | 9/2003 | Langsdorf et al. |
| 2004/0107733 A1 | 6/2004 | Yashizawa |
| 2005/0099618 A1 | 5/2005 | DiFoggio et al. |
| 2005/0138892 A1 | 6/2005 | Misonou |
| 2005/0266247 A1 | 12/2005 | Yoshizawa |
| 2006/0054774 A1 | 3/2006 | Yassour et al. |
| 2006/0121281 A1 | 6/2006 | Tamai et al. |
| 2006/0179722 A1 | 8/2006 | Spindler |
| 2006/0219605 A1 | 10/2006 | Devitt |
| 2007/0122580 A1 | 5/2007 | Krall et al. |
| 2007/0271957 A1 | 11/2007 | Nakamura et al. |
| 2008/0314403 A1 | 12/2008 | Rebours |
| 2009/0069163 A1 | 3/2009 | Beall |
| 2009/0092472 A1 | 4/2009 | Luo et al. |
| 2009/0220761 A1 | 9/2009 | Dejneka et al. |
| 2010/0035038 A1 | 2/2010 | Barefoot et al. |
| 2010/0084016 A1 | 4/2010 | Aitken et al. |
| 2010/0130251 A1 | 5/2010 | Chu |
| 2010/0162761 A1 | 7/2010 | Carney et al. |
| 2010/0183767 A1 | 7/2010 | Noordam et al. |
| 2010/0279068 A1 | 11/2010 | Cook et al. |
| 2011/0123832 A1* | 5/2011 | Matsumoto ............ C03C 3/095 501/63 |
| 2011/0123833 A1 | 5/2011 | Endo et al. |
| 2011/0200804 A1 | 8/2011 | Tomamoto et al. |
| 2011/0281093 A1 | 11/2011 | Gulati et al. |
| 2011/0289971 A1 | 12/2011 | Brown et al. |
| 2011/0289972 A1 | 12/2011 | Brown et al. |
| 2012/0144867 A1 | 6/2012 | Busch |
| 2012/0145991 A1 | 6/2012 | Nam et al. |
| 2012/0194974 A1 | 8/2012 | Weber et al. |
| 2012/0247063 A1 | 10/2012 | Grzybowski et al. |
| 2012/0258250 A1 | 10/2012 | Rodgers |
| 2012/0291707 A1 | 11/2012 | Granneman |
| 2013/0008500 A1 | 1/2013 | Lin et al. |
| 2013/0019639 A1 | 1/2013 | Saito et al. |
| 2013/0047673 A1 | 2/2013 | Lee et al. |
| 2013/0052347 A1 | 2/2013 | Kuznetsov et al. |
| 2013/0071666 A1 | 3/2013 | Komori et al. |
| 2013/0122284 A1 | 5/2013 | Gross |
| 2013/0122313 A1 | 5/2013 | Gross |
| 2013/0199448 A1 | 8/2013 | Granneman et al. |
| 2013/0255314 A1 | 10/2013 | Allan et al. |
| 2013/0323444 A1 | 12/2013 | Ehemann et al. |
| 2014/0026622 A1 | 1/2014 | Wang |
| 2014/0050912 A1 | 2/2014 | Isono et al. |
| 2014/0053605 A1 | 2/2014 | Mader |
| 2014/0065401 A1 | 3/2014 | Donovan et al. |
| 2014/0113854 A1 | 4/2014 | Ni et al. |
| 2014/0120279 A1 | 5/2014 | Demartino et al. |
| 2014/0141217 A1 | 5/2014 | Gulati et al. |
| 2014/0162000 A1 | 6/2014 | Son et al. |
| 2014/0218867 A1 | 8/2014 | Kim et al. |
| 2014/0242391 A1 | 8/2014 | Ono et al. |
| 2014/0290310 A1 | 10/2014 | Green |
| 2014/0370303 A1 | 12/2014 | Jin et al. |
| 2015/0027169 A1 | 1/2015 | Fredholm |
| 2015/0030827 A1 | 1/2015 | Gomez et al. |
| 2015/0031752 A1 | 1/2015 | Keil et al. |
| 2015/0037552 A1 | 2/2015 | Mauro |
| 2015/0052949 A1 | 2/2015 | Bayne et al. |

(56) References Cited

U.S. PATENT DOCUMENTS

| | | |
|---|---|---|
| 2015/0082834 A1 | 3/2015 | Vehmas et al. |
| 2015/0083200 A1 | 3/2015 | Hickman et al. |
| 2015/0096331 A1 | 4/2015 | Rantala et al. |
| 2015/0158757 A1 | 6/2015 | Amma et al. |
| 2015/0166401 A1 | 6/2015 | Yamamoto |
| 2015/0218045 A1 | 8/2015 | Balcom et al. |
| 2015/0240038 A1 | 8/2015 | Macedo et al. |
| 2015/0251353 A1 | 9/2015 | Rodgers et al. |
| 2015/0274015 A1 | 10/2015 | Wachinger et al. |
| 2015/0307385 A1 | 10/2015 | Klein et al. |
| 2015/0343704 A1 | 12/2015 | Stahl et al. |
| 2015/0368153 A1 | 12/2015 | Pesansky et al. |
| 2016/0002103 A1 | 1/2016 | Wang et al. |
| 2016/0031742 A1 | 2/2016 | Maschmeyer et al. |
| 2016/0031743 A1 | 2/2016 | Maschmeyer et al. |
| 2016/0031744 A1 | 2/2016 | Maschmeyer et al. |
| 2016/0031752 A1 | 2/2016 | Maschmeyer et al. |
| 2016/0168023 A1* | 6/2016 | Baum, Jr. ............... C03C 3/085 428/220 |
| 2016/0194233 A1 | 7/2016 | Van Pelt |
| 2016/0194239 A1 | 7/2016 | Seto |
| 2016/0207819 A1 | 7/2016 | Cleary et al. |
| 2016/0281233 A1 | 9/2016 | Granneman et al. |
| 2016/0304352 A1 | 10/2016 | Fernandez et al. |
| 2016/0326051 A1 | 11/2016 | Kim |
| 2017/0072613 A2 | 3/2017 | Bracha et al. |
| 2017/0158543 A1 | 6/2017 | Metz et al. |
| 2017/0361574 A1 | 12/2017 | Kiczenski et al. |
| 2018/0210308 A1 | 7/2018 | Lam et al. |
| 2018/0304588 A1 | 10/2018 | Harris et al. |
| 2019/0030861 A1 | 1/2019 | Bellman et al. |
| 2019/0227357 A1 | 7/2019 | Williams et al. |
| 2019/0270284 A1 | 9/2019 | Couillard et al. |
| 2019/0391337 A1 | 12/2019 | Sato |

FOREIGN PATENT DOCUMENTS

| | | |
|---|---|---|
| AU | 05351/29 B2 | 3/1984 |
| CA | 1148742 A | 6/1983 |
| CA | 1176468 A | 10/1984 |
| CA | 2171323 A1 | 1/1996 |
| CN | 1208266 A | 2/1999 |
| CN | 1693247 A | 11/2005 |
| CN | 1896020 A | 1/2007 |
| CN | 101312919 A | 11/2008 |
| CN | 101671112 A | 3/2010 |
| CN | 101774751 A | 7/2010 |
| CN | 102149649 A | 8/2011 |
| CN | 102659305 A | 9/2012 |
| CN | 102863146 A | 1/2013 |
| CN | 103253857 A | 8/2013 |
| CN | 103319082 A | 9/2013 |
| CN | 103359934 A | 10/2013 |
| CN | 103534216 A | 1/2014 |
| CN | 103781733 A | 5/2014 |
| CN | 103827051 A | 5/2014 |
| CN | 104211288 A | 12/2014 |
| CN | 104260569 A | 1/2015 |
| CN | 104310773 A | 1/2015 |
| CN | 104355530 A | 2/2015 |
| CN | 104479282 A | 4/2015 |
| CN | 104583141 A | 4/2015 |
| CN | 205275454 U | 6/2016 |
| CN | 106045283 A | 10/2016 |
| DE | 2233057 A1 | 3/1973 |
| EP | 0173418 A2 | 3/1986 |
| EP | 0413254 A1 | 2/1991 |
| EP | 0882681 A1 | 12/1998 |
| EP | 1215039 A2 | 6/2002 |
| EP | 1245545 A1 | 10/2002 |
| EP | 1380550 A1 | 1/2004 |
| EP | 1414762 A1 | 5/2004 |
| EP | 1533282 A1 | 5/2005 |
| EP | 1925952 A1 | 5/2008 |
| EP | 2543644 A2 | 1/2013 |
| EP | 2853517 A1 | 4/2015 |
| FR | 2326386 A1 | 4/1977 |
| GB | 0996423 A | 6/1965 |
| GB | 1103192 A | 2/1968 |
| GB | 1112781 A | 5/1968 |
| GB | 1160284 A | 8/1969 |
| GB | 1253681 A | 11/1971 |
| GB | 1282720 A | 7/1972 |
| GB | 1289488 A | 9/1972 |
| GB | 2232978 A | 1/1991 |
| IN | 202420 | 5/2005 |
| IN | 200803022 | 8/2008 |
| JP | 51-103920 A | 9/1976 |
| JP | 55-104935 A | 8/1980 |
| JP | 56-155030 A | 12/1981 |
| JP | 56-155031 A | 12/1981 |
| JP | 57-067035 A | 4/1982 |
| JP | 57-067036 A | 4/1982 |
| JP | 58-088132 A | 5/1983 |
| JP | 58-091042 A | 5/1983 |
| JP | 59-008626 A | 1/1984 |
| JP | 59-008627 A | 1/1984 |
| JP | 59-008628 A | 1/1984 |
| JP | 59-008629 A | 1/1984 |
| JP | 59-008630 A | 1/1984 |
| JP | 59-008631 A | 1/1984 |
| JP | 59-057923 A | 4/1984 |
| JP | 60-171245 A | 9/1985 |
| JP | 61-072637 A | 4/1986 |
| JP | 61-141756 | 6/1986 |
| JP | 62-036030 A | 2/1987 |
| JP | 63-270330 A | 11/1988 |
| JP | 02-102436 A | 4/1990 |
| JP | 02-175624 A | 7/1990 |
| JP | 03-045526 A | 2/1991 |
| JP | 03-271127 A | 12/1991 |
| JP | 06-336533 A | 12/1994 |
| JP | 07-089739 A | 4/1995 |
| JP | 07-809739 A | 4/1995 |
| JP | 07-157322 A | 6/1995 |
| JP | 07-267664 A | 10/1995 |
| JP | 11-199257 A | 7/1999 |
| JP | 2000-072463 A | 3/2000 |
| JP | 2000-103632 A | 4/2000 |
| JP | 2000-172202 A | 6/2000 |
| JP | 2000-327355 A | 11/2000 |
| JP | 2001-002434 A | 1/2001 |
| JP | 2001180967 * | 7/2001 |
| JP | 2001180967 A | 7/2001 |
| JP | 2001-307662 A | 11/2001 |
| JP | 2003-040635 A | 2/2003 |
| JP | 2003-137603 A | 5/2003 |
| JP | 2003-261344 A | 9/2003 |
| JP | 2003-342030 A | 12/2003 |
| JP | 2004-091311 A | 3/2004 |
| JP | 2007-191319 A | 8/2007 |
| JP | 2007-261850 A | 10/2007 |
| JP | 4397196 B2 | 1/2010 |
| JP | 4438126 B2 | 3/2010 |
| JP | 4557606 B2 | 10/2010 |
| JP | 4642107 B2 | 3/2011 |
| JP | 4722371 B2 | 7/2011 |
| JP | 4951838 B2 | 6/2012 |
| JP | 2012-232882 A | 11/2012 |
| JP | 5334005 B2 | 11/2013 |
| JP | 2015-086080 A | 5/2015 |
| JP | 5714701 B2 | 5/2015 |
| KR | 10-0218143 B1 | 9/1999 |
| KR | 10-2002-0061567 A | 7/2002 |
| KR | 10-0690381 B1 | 3/2007 |
| KR | 10-0909835 B1 | 7/2009 |
| KR | 10-0918577 B1 | 9/2009 |
| KR | 10-0937889 B1 | 1/2010 |
| KR | 10-1000677 B1 | 12/2010 |
| KR | 10-1032825 B1 | 5/2011 |
| KR | 10-2011-0087774 A | 8/2011 |
| KR | 10-2011-0106629 A | 9/2011 |
| KR | 10-2011-0112503 A | 10/2011 |

(56) References Cited

FOREIGN PATENT DOCUMENTS

| | | |
|---|---|---|
| KR | 10-1093947 B1 | 12/2011 |
| KR | 10-1120262 B1 | 3/2012 |
| KR | 10-2012-0051220 A | 5/2012 |
| KR | 10-2012-0070450 A | 6/2012 |
| KR | 10-2013-0024484 A | 3/2013 |
| KR | 10-1248380 B1 | 3/2013 |
| KR | 10-1286131 B1 | 7/2013 |
| KR | 10-1413626 B1 | 8/2014 |
| KR | 10-2014-0110364 A | 9/2014 |
| KR | 10-2014-0135846 A | 11/2014 |
| RU | 2151750 C1 | 6/2000 |
| RU | 2199496 C2 | 2/2003 |
| RU | 2237621 C1 | 10/2004 |
| RU | 2299184 C1 | 5/2007 |
| RU | 2464243 C1 | 10/2012 |
| SU | 443845 A1 | 9/1974 |
| SU | 537960 A1 | 12/1976 |
| SU | 548188 A1 | 9/1982 |
| SU | 1098916 A1 | 6/1984 |
| SU | 1655920 A1 | 6/1991 |
| WO | 90/03337 A1 | 4/1990 |
| WO | 99/44952 A1 | 9/1999 |
| WO | 01/16040 A1 | 3/2001 |
| WO | 200134531 A1 | 5/2001 |
| WO | WO200134531 * | 5/2001 |
| WO | 02/16277 A1 | 2/2002 |
| WO | 03/14035 A1 | 2/2003 |
| WO | 2006/083902 A1 | 8/2006 |
| WO | 2006/110145 A1 | 10/2006 |
| WO | 2008/020509 A1 | 2/2008 |
| WO | 2008/143999 A1 | 11/2008 |
| WO | 2008/147558 A1 | 12/2008 |
| WO | 2010/076903 A1 | 7/2010 |
| WO | 2011/122678 A1 | 10/2011 |
| WO | 2012/082709 A1 | 6/2012 |
| WO | 2012/125857 A1 | 9/2012 |
| WO | 2012/142629 A1 | 10/2012 |
| WO | 2013/016157 A1 | 1/2013 |
| WO | 2014/030682 A1 | 2/2014 |
| WO | 2014/060108 A2 | 4/2014 |
| WO | 2014/139147 A1 | 9/2014 |
| WO | 2014/182776 A1 | 11/2014 |
| WO | 2014/201315 A1 | 12/2014 |
| WO | 2015/031148 A1 | 3/2015 |
| WO | 2015/031594 A2 | 3/2015 |
| WO | 2015/033562 A1 | 3/2015 |
| WO | 2016/019171 A1 | 2/2016 |
| WO | 2016/057590 A1 | 4/2016 |
| WO | 2016/094262 A1 | 6/2016 |
| WO | 2017/019837 A1 | 2/2017 |
| WO | 2017/020041 A1 | 2/2017 |
| WO | 2017/071911 A1 | 5/2017 |
| WO | 2017139552 A1 | 8/2017 |
| WO | 2021/025981 A1 | 2/2021 |

OTHER PUBLICATIONS

International Search Report and Written Opinion of the International Searching Authority; PCT/US2018/047859; dated Feb. 20, 2019; 19 Pages; European Patent Office.

Invitation to Pay Additional Fees of the International Searching Authority; PCT/US2018/047859; dated Dec. 7, 2018; 16 Pages; European Patent Office.

Morey; "The Effect of Boric Oxide on the Devitrification of the Soda-Lime-Silica Glasses. The Quaternary System, Na20—CaO—B2O3—SiO2"; Journal of the Amercian Ceramic Society; vol. 15, Issue 9; pp. 457-475 (1932).

Narayan Aswamy; "Stress and Structural Relaxation in Tempering Glass," J. Am. Ceram. Soc., 61[3-4] 146-152 (1978).

Ohlberg et al.; "Thermal Stress Calculations Based on a Linear Viscoelastic Deviatoric Response and a Fictive Temperature Component for the Volumetric Response," Journal of Non-Crystalline Solids, 14 280-286 (1974).

Timoshenko et al; "Theory of Elasticity"; 2nd Ed; p. 146. McGraw-Hill Book Co., New York, 1951.

Chen, et al., "Nanopatterned Graphene on a Polymer Substrate by a Direct Peel-off Technique", ACS Appl. Mater. Interfaces, vol. 7, Issue 10, 2015, pp. 5938-5943.

Choi et al., "Influence of removing PMMA residues on surface of CVD graphene using a contact-mode atomic force Microscope" RSC Adv., vol. 7, 2017, pp. 6943-6949.

Gammelgaard et al., "Graphene transport properties upon exposure to PMMA processing and heat treatments", 2D Materials, vol. 1, 2014, 035005, 12 pages.

Lin et al., "Graphene annealing: how clean can it be?", Nano Lett., vol. 12, Issue 1, 2012, pp. 414-419.

ASTM C1499-09, "Standard Test Method for Monotonic Equibiaxial Flexural Strength of Advanced Ceramics at Ambient Temperature", 2013, 14 pages.

ASTM C158-02, "Standard Test Methods for Strength of Glass by Flexure" (Determination of Modulus of Rupture), 2012, 9 pages.

Guo, Xiaoju et al. "Unified approach for determining the enthalpic fictive temperature of glasses with arbitrary thermal history" Journal of Non-Crystalline Solids, vol. 357, 2011, pp. 3230-3236.

International Search Report and Written Opinion of the International Searching Authority; PCT/US2020/027913; dated Aug. 3, 2021; 11 pages; European Patent Office.

Luo et al., "Competing Indentation Deformation Mechanisms in Glass Using Different Strengthening Methods", Frontiers in Materials, vol. 3, No. 52, 2016, 11 pages.

Aben, H. et al., "2.7 Stresses Due to Heterogeneities," Photoelasticity of Glass, Springer-Verlag, New York, 1993, 260 pages.

Acloque, P., "Influence of Strain-Systems in Glass upon the Course of its Fracture," Proceedings of the 4th International Glass Congress, vol. 6, 1965, pp. 279-291.

Acloque, Paul, "Comparison Between Heat-Transfer Conditions and Setting Up of Strain in Glass During Heat-Treatment," Journal of the American Ceramic Society, vol. 44, No. 7, Jul. 1961, pp. 364-373.

Agarwal, Anand et al., "A simple IR spectroscopic method for determining fictive temperature of silica glasses," Journal of Non-Crystalline Solids, vol. 185, 1995, pp. 191-198.

Agarwal, Anand et al., "Determination of Fictive Temperature of Soda-Lime Silicate Glass," Journal of the American Ceramic Society, vol. 78, No. 3, Mar. 1995, pp. 827-829.

Akeyoshi, K. et al., "Mechanical Properties of Tempered Glass," Proceedings of the 7th International Glass Congress, vol. 14, 1965, pp. 80-85.

Alexiades, V. et al., "The New Way/Glaston Problem," 28th Annual Workshop on Mathematical Problems in Industry, University of Delaware, Jun. 2012, 30 slides.

Argon, A. S., "Chapter 3: Inelastic Deformation and Fracture in Oxide, Metallic, and Polymeric Glasses," In, "Glass Science and Technology," vol. 5, Elasticity and Strength in Glass, Academic Press, May 28, 1980, pp. 79-132.

Aronen, Antti et al., "Tempering of Thin Glass," Glasstec 2012: Engineered Transparency, Oct. 25-26, 2012, pp. 145-153.

Author Unknown, "Application Note AN 527: Depth profiling of complex samples using confocal Raman microscopy," Bruker Optics Inc., 2012, 3 pages.

Author Unknown, "Architectural ERH2 ," Architectural Glass Systems, Glasstech, Inc., 2011, 2 pages.

Author Unknown, "Architectural FCH2(Trademark) ," Architectural Glass Systems, Glasstech, Inc., 2011, 2 pages.

Author Unknown, "Coming(Registered) Gorilla(Trademark) Glass," Coming Incorporated, 2009, 2 pages.

Author Unknown, "Glass Strengthening Methods," Abrisa Technologies, Apr. 2015, 2 pages.

Author Unknown, "Heat Treated Glass for Architectural Glazing," Glass Technical Document: TD-138, PPG Glass Technology, PPG Industries, Inc., Nov. 2011, 8 pages.

Author Unknown, "Introducing-Glasstech CRB-S.TM. 1900 for Solar Parabolic Shapes," Solar Glass Systems, Glasstech, Inc., Date Unknown, 1 page, Retrieved Jul. 1, 2015.

(56) References Cited

OTHER PUBLICATIONS

Author Unknown, "New Way Air Bearings," 28th Annual Workshop on Mathematical Problems in Industry, University of Delaware, Jun. 2012, 16 slides.
Author Unknown, "Products, Glazing Techniques and Maintenance Section 4: GGF Dalasheet for the Quality of Thermally Toughened Soda Lime Silicate Safety Glass for Building," Glass and Glazing Federation, Aug. 2009, 12 pages.
Author Unknown, "Schott Technical Glasses—Physical and technical properties," Schott North America, Inc., Feb. 2010, 44 pages.
Author Unknown, "scratch and dig numbers," Sizes, Inc., Last Revised: Jun. 24, 2010, 5 pages, http://www.sizes.com/units/scratch_and_dig.him.
Author Unknown, "Solar FCH-S(Trademark)," Solar Glass Systems, Glasstech, Inc., 2011, 2 pages.
Author Unknown, "Standard Specification for Heat-Strengthened and Fully Tempered Flat Glass," Designation: C 1048-12, ASTM International Standard, 2015, 7 pages.
Author Unknown, "Standard Specification for Heat-Treated Flat Glass-Kind HS, Kind FT Coated and Uncoated Glass," Designation: C 1048-4, ASTM International Standard, 2009, 7 pages.
Author Unknown, "Subject Index," Date Unknown, pp. 277-282.
Author Unknown, "Thermal Tempering," EuropTec GmbH, Nov. 6, 2014, 2 pages.
Author Unknown, "Unsteady Heat Transfer—HT3: Experimental Studies of Thermal Diffusivities and Heat Transfer Coefficients," Date Unknown, 27 slides.
Ayinder, C.C. et al., "Thermal-Tempering Analysis of Bulk Metallic Glass Plates Using an Instant-Freezing Model," Metallurgical and Materials Transactions A, vol. 32A, Nov. 2001, pp. 2709-2715.
Baldwin, K. J. et al., "Confocal Raman Microspectroscopy through a Planar Interface," Applied Spectroscopy, vol. 55, No. 5, 2001, pp. 517-524.
Bandyopadhyay et al; "Application of Fused Deposition in Controlled Microstructure Metal-Ceramic Composites", Rapid Prototyping Journal, vol. 12 Issue 3, pp. 121 128 (2006).
Barr, J. W., "Glass Tempering by Numbers," Aug. 2008, 8 pages.
Barr, Jonathan W., "The Tempering Process," Cardinal Waxachachie Tempering Seminar, Mar. 26, 2008, 36 slides.
Barr, Jonathan, "The Glass Tempering Handbook-Understanding the Glass Tempering Process," Self Published, 2015, 52 pages, http://www.lambertgtservices.co.uk/book/TheGlassTemperingHandbook.pdf.
Barsom, John M., "Fracture of Tempered Glass," Journal of the American Ceramic Society, vol. 51, No. 2, Feb. 1968, pp. 75-78.
Bartholomew, Roger F. et al., "Chapter 6: Chemical Strengthening of Glass," In "Glass: Science and Technology," vol. 5, Elasticity and Strength in Glass, Academic Press, May 28, 1980, pp. 217-270.
Beauchamp, Edwin K. et al., "Dynamics of Window Glass Fracture in Explosions," Sandia Report SAND98-0598 UC-700, Sandia National Laboratories, May 1998, 74 pages.
Bird, R. D., W. E. Stewart, and E. N. Lightfoot, Transport Phenomena—Chapter 11: The Equations of Change for Nonisothermal Systems, Wiley, (1960) pp. 349-373.
Bird, R. D., W. E. Stewart, and E. N. Lightfoot, Transport Phenomena—Chapter 3: The Equations of Change for Isothermal Systems, Wiley, (1960) pp. 75-113.
Boaz, Prem, "Tempering Very Thin Glass—What Radio Waves Mean for the Glass Industry," USGlass Magazine, vol. 45, Issue 3, Mar. 2010, 5 pages.
Boaz, Prem, "Thin glass processing with radio wave assist," Glass on Web, Last Reviewed: Jan. 2013, 6 pages, http://www.glassonweb.com/articles/article/561/.
Boguslavskll, I. A., "Studying the Nature of the Super-Strength of Glasses Strengthened by the Thermophysical Method," Glass and Ceramics, vol. 21, No. 10, Oct. 1964, pp. 562-567.
Brown, Angus M., "Nonlinear regression analysis of data using a spreadsheet," Application Note, ISC, Oct. 2001, pp. 58-59.
CN101671112A English Translation Performed by USPTO Translations Service Center Apr. 2017.

Conradt, Reinhard, "I. Fragility and its Relation to Other Glass Properties," IMI-NFG's MITT Course on Relaxation Processes in Glass Lecture 21, Apr. 6-8, 2010, 61 slides.
Conradt, Reinhard, "II. Networks," IIMI-NFG's Min Course on Relaxation Processes in Glass Lecture 22, Apr. 6-8, 2010, 61 slides.
Conway, Jr., Joseph C. et al., "Use of Crack Branching Data for Measuring Near-Surface Residual Stresses in Tempered Glass," Journal of the American Ceramic Society, vol. 72, No. 9, Sep. 1989, pp. 1584-1587.
Cox, Dr. Chris, "Lecture 3: Complex exponential function, Fourier and Laplace transforms," IMI-NFG's MITT Course on Relaxation Processes in Glass and Polymers Lecture 3, 2010, 25 slides.
Cox, Dr. Chris, "Lecture 4: Differential Equations," IMI-NFG's Min Course on Relaxation Processes in Glass and Polymers Lecture 4, 2010, 24 slides.
Danishkin, G. K. et al., "Development of a Continuous Method of Bending and Toughening Glass," Glass and Ceramics, vol. 34, Issue 8, Aug. 1977, pp. 495-498.
Daudeville, L. et al., "Numerical Simulation of Soda-Lime Silicate Glass Tempering," Journal de Physique IV, France, vol. 6, No. C1, Jan. 1996, pp. C1-175-C1-185.
Daudeville, Laurent et al., "Thermal Tempering Simulation of Glass Plates: Inner and Edge Residual Stresses," Journal of Thermal Stresses, vol. 21, 1998, pp. 667-689.
International Search Report and Writen Opinin PCT/US2016/044401 dated Jan. 2, 2017.
International Search Report and Writien Opinion PCT/US2016/044445 dated Oct. 14, 2016.
International Search Report and Written Opinion of the International Searching Authority; PCT/US15/42955; dated Nov. 4, 2015; 10 Pages; European Patent Office.
International Search Report and Written Opinion of the International Searching Authority; PCT/US16/45022; dated Jan. 31, 2017; 20 Pages; European Patent Office.
International Search Report and Written Opinion of the International Searching Authority; PCT/US2016/044406; dated Nov. 25, 2016; 15 Pages; European Patent Office.
International Search Report and Written Opinion of the International Searching Authority; PCT/US2020/062128; dated Mar. 15, 2021; 9 pages; European Patent Office.
International Search Report and Written Opinion of the International Searching Authority; PCT/US2020/062145; dated Mar. 16, 2021, 11 pages; Korean Patent Office.
International Search Report and Written Opinion PCT/US2015/042965 dated Nov. 2, 2015.
Ito, Setsuro, "Brittleness and Nano-Structure of Glass," 4th International Workshop on Flow and Fracture of Advanced Glasses Presentation, Nov. 5-7, 2007, Shiga, Japan, 37 slides.
Jain, Himanshu, "Electrical Relaxation—Topic 1: Quasi-free ion transport," IMI-NFG's MITI Course on Relaxation Processes in Glass Lecture 23, Advanced Vitreous State, The Properties of Glass: Dielectric Properties—Lecture 1, 2010, 28 slides.
Jain, Himanshu, "Electrical Relaxation—Topic 3: Nearly constant loss—second universality," IMI-NFG's Min Course on Relaxation Processes in Glass Lecture 25, Advanced Vitreous State, The Properties of Glass: Dielectric Properties—Lecture 3, 2010, 24 slides.
Jain, Himanshu, "Electrical Relaxation-Topic 2: Universal dielectric response (UDR)," IMI-NFG's MITI Course on Relaxation Processes in Glass Lecture 24, Advanced Vitreous State, The Properties of Glass: Dielectric Properties—Lecture 1, 2010, 22 slides.
Karlsson, Stefan et al., "The technology of chemical glass strengthening—a review," Glass Technology, European Journal of Glass Science Technology Part A, vol. 51, No. 2, Apr. 2010, pp. 41-54.
Kassir-Bodon, Assia et al., "Raman Mapping of the Indentation-Induced Densification of a Soda-Lime-Silicate Glass," International Journal of Applied Glass Science, vol. 3, No. 1, 2012, pp. 29-35.
Kiefer, Werner et al., "Method for Thermal Prestressing of Glass," Strength of Inorganic Glass, Plenum Press, New York, 1985, pp. 501-511.

(56) References Cited

OTHER PUBLICATIONS

Kishii, Toru, "Surface Stress Meters Utilising the Optical Waveguide Effect of Chemically Tempered Glasses," Optics and Lasers in Engineering, vol. 4, 1983, pp. 25-38.
Kistler, S. S., "Stresses in Glass Produced by Nonuniform Exchange of Monovalent Ions," Journal of the American Ceramic Society, vol. 45, No. 2, Feb. 1962, pp. 59-68.
Klein et al; "Additive Manufacturing of Optically Transparent Glass"; 3D Printing and Additive Manufacturing; vol. 2, No. 3; 2015; pp. 92-105.
Koike, A. et al., "Fictive temperature dependence of subcritical crack growth rate of normal glass and anomalous glass," Journal of Non-Crystalline Solids, vol. 352, 2006, pp. 5522-5530.
Kong, Jinhak et al., "Residual Stress Analysis with Improved Numerical Methods for Tempered Plate Glasses Based on Structural Relaxation Model," Metals and Materials International, vol. 13, No. 1, 2007, pp. 67-75.
Lathabai, Srinivasarao et al., "Fracture mechanics model for sub-threshold indentation flaws: Part 1—Equilibrium fracture," Journal of Materials Science, vol. 26, 1991, pp. 2157-2168.
Lee, Hoikwan et al., "Glass Thickness and Fragmentation Behavior in Stressed Glasses," New Journal of Glass and Ceramics, vol. 2, 2012, pp. 138-143.
Lezzi, P. J. et al., "Confirmation of thin surface residual compressive stress in silica glass fiber by FTIR reflection spectroscopy," Journal of Non-Crystalline Solids, vol. 390, 2014, pp. 13-18.
Li, Hong et al., "Effect of Fictive Temperature on Dynamic Fatigue Behavior of Silica and Soda-Lime Glasses," Journal of the American Ceramic Society, vol. 78, No. 5, 1995, pp. 1393-1396.
Loucks, "Lecture 13: The Fictive and Glass Transition Temperatures," IMI-NFG's Min Course on Relaxation Processes in Glass Lecture 13, Mar. 2, 2010, 25 Slides.
Loucks, "Lecture 15: The Tool-Narayanaswamy-Moynihan Equation Part II and DSC," IMI-NFG's MITT Course on Relaxation Processes in Glass Lecture 15, Mar. 9, 2010, 33 Slides.
Loucks, Dr. Roger, "Lecture 14: Relaxation and theTool-Narayanaswamy-Moynihan Equation," IMI-NFG's MITT Course on Relaxation Processes in Glass Lecture 14, Mar. 4, 2010, 27 slides.
Loucks, Dr. Roger, "Lecture 16: The Tool-Narayanaswamy-Moynihan Equation Part II and DSC," IMI-NFG's MITT Course on Relaxation Processes in Glass Lecture 16, Mar. 11, 2010, 32 slides.
Luo et al; "Additive Manufacturing of Glass for Optical Applications"; Proc. of SPIE, vol. 9738, 2016; pp. 97380Y-1-97380Y-9.
Markovsky, Alex et al., "An Efficient and Stable Algorithm for Calculating Fictive Temperatures," Communications of the American Ceramic Society, Apr. 1984, 2 pages.
Martin, Dr. Steve, "Lecture 10: Thermodynamic Functions," IMI-NFG's MITT Course on Relaxation Processes in Glass Lecture 10, 2010, 25 slides.
Martin, Dr. Steve, "Lecture 11: Thermodynamics in the Glass Transition Region," IMI-NFG's MITT Course on Relaxation Processes in Glass Lecture 11, 2010, 22 slides.
Martin, Dr. Steve, "Lecture 12: The Glass Transition as a Kinetic Transition," IMI-NFG's Min Course on Relaxation Processes in Glass Lecture 12, 2010, 21 slides.
Martin, Dr. Steve, "Lecture 9: Thermodynamic Concepts and the Law of Thermodynamics," IMI-NFG's Min Course on Relaxation Processes in Glass Lecture 9, 2010, 32 slides.
Massen, Claire P. et al., "Power-law distributions for the areas of the basins of attraction on a potential energy landscape," Physical Review E, The American Physical Society, vol. 75, 2007, 4 pages.
Mauricio-Iglesias, M. et al., "Raman depth-profiling characterization of a migrant diffusion in a polymer," Journal of Membrane Science, vol. 375, 2011, pp. 165-171.
McGlinchy, Timothy B., "Energy Efficient Tripe IG Automation EEE (Triple-E)," DE-EE0000167, GED Integrated Solutions, Feb. 28, 2013, 45 pages.

McMaster, Ronald A et al., "Annealed and Tempered Glass," Engineered Materials Handbook, vol. 4, Ceramics and Glasses, 1991, 9 pages.
McMaster, Ronald A., "Flat Glass Tempering—How II Works," Glass Industry, Jun. 1989, pp. 10-15.
McMaster, Ronald A., "Fundamentals of Tempered Glass," Proceedings of the 49th Conference on Glass Problems Ceramic Engineering and Science Proceedings, vol. 10, Issue 3/4, 1989, pp. 193-206.
Mikowski, A. et al., "Statistical analysis of threshold load for radial crack nucleation by Vickers indentation in commercial soda-lime silica glass," Journal of Non-Crystalline Solids, vol. 352, 2006, pp. 3544-3549.
Mognato, Ennio et al., "Thermally toughened safety glass," Glass on Web, Last Reviewed: Jul. 2011, 9 pages, http://www.glassonweb.com/articles/article/727/.
Moynihan, C. T. et al., "Structural Relaxation in Vitreous Materials," Annals of the New York Academic of Sciences, vol. 279, Oct. 1976, pp. 15-35.
Narayanaswamy, O. S et al., "Calculation of Residual Stresses in Glass," Journal of the American Ceramic Society, vol. 52, No. 10, Oct. 1969, pp. 554-558.
Narayanaswamy, O. S., "Stress and Structural Relaxation in Tempering Glass," Journal of the American Ceramic Society, vol. 61, No. 3-4, Mar.-Apr. 1978, pp. 146-152.
Oakley, David R., "Crack branching in float glass subjected to biaxial loading," Journal of Non-Crystalline Solids, vol. 196, 1996, pp. 139-143.
Ohlberg, S.M. et al., "Thermal Stress Calculations Based on a Linear Viscoelastic Deviatoric Response and a Fictive Temperature Component for the Volumetric Response," Journal of Non-Crystalline Solids, vol. 14, 1974, pp. 280-286.
Paschel, Richard, "History of the Safety Glazing Certification Council," Safety Glazing Certification Council, Date Unknown, 11 pages.
Ray, N. H. et al., "Increasing the strength of glass by treatment in molten salts," Physics and Chemistry of Glasses, vol. 8, No. 1, Feb. 1967, pp. 30-34.
Rekhson, S. M., "Chapter 1: Viscoelasticity of Glass," In "Glass: Science and Technology," vol. 3, 1986, 117 pages.
Rekson, S. M., "Structural Relaxation and Shear Stresses in the Glass-Transition Region," Soviet Journal of Glass Physics and Chemistry, 1975, pp. 417-421.
Sastry, Srikanth, "The relationship between fragility, configurational entropy and the potential energy landscape of glass-forming liquids," Nature, vol. 409, Jan. 11, 2001, pp. 164-167.
Scherer, George W., "Use of the Adam-Gibbs Equation in the Analysis of Structural Relaxation," Journal of the American Ceramic Society, vol. 67, No. 7, Jul. 1984, pp. 504-511.
Sciortino, Francesco, "Potential energy landscape description of supercooled liquids and glasses," Journal of Statistical Mechanics: Theory and Experiment, May 31, 2005, 35 pages.
Sehgal, Jeetendra et al., "A New Low-Brittleness Glass in the Soda-Lime-Silica Glass Family," Journal of the American Ceramic Society, vol. 81, No. 9, Sep. 1998, pp. 2485-2488.
Setsuro, Ito et al., "Processing Technical Books to the Glass High-Functions," Chapter 3: Sections 2.5, 3, 3.1, 3.2 & 3.3, Science & Technology Co., Ltd., Sep. 27, 2012, pp. 58-65.
Sglavo, V., A. Prezzi, M. Alessandrini, "Processing of Glasses with Engineered Stress Profiles," Journal of Non-Crystalline Solids, 344 (2004), 73-78.
Shelby "Introduction to Glass Science and Technology"; The Royal Chemical Society, 2nd Edition, 2005; p. 193.
Shimodaira, N. et al., "Raman spectra of fluorine-doped silica glasses with various fictive temperatures," Journal of Applied Physics, vol. 91, No. 6, Mar. 15, 2002, pp. 3522-3525.
Shinkai, Norihiko et al., "Indentation Fracture of Tempered Glasses," Reports of the Research Laboratory, Asahi Glass Co., Ltd., vol. 23, No. 2, 1973, pp. 83-99.
Shouyuan, Zhai et al., "Influence of Temperature and Time on Glass Strength During Chemical Tempering," [8J Journal of Shangdong Institute of Light Industry (Natural Science Edition), Feb. 1996, 3 pages.

(56) References Cited

OTHER PUBLICATIONS

Shutov, A. I. et al., "Prediction of the Character of Tempered Glass Fracture," Glass and Ceramics, vol. 55, Nos. 1-2, 1998, pp. 8-10.
Soules, Thomas F. et al., "Finite-Element Calculation of Stresses in Glass Parts Undergoing Viscous Relaxation," Journal of the American Ceramic Society, vol. 70, No. 2, Feb. 1987, pp. 90-95.
Southard, J. C., "The Thermal Properties of Crystalline and Glassy Boron Trioxide," Journal of the American Chemical Society, vol. 63, No. 11, Nov. 1941, pp. 3147-3150.
Spaght, Monroe E. et al., "Studies on Glass. VIII. The Coefficient of Thermal Expansion of Boron Trioxide," Journal of Physical Chemistry, vol. 38, No. 1, 1934, pp. 103-110.
Specialty Glass Products, "Soda Lime/AR/Flint Glass"; http://www.sgpinc.com/sodalime.htm accessed Aug. 11, 2016.
Stillinger, Frank H. et al., "Packing Structures and Transitions in Liquids and Solids," Science, New Series, vol. 225, No. 4666, Sep. 7, 1984, pp. 983-989.
Stillinger, Frank H., "A Topographic View of Supercooled Liquids and Glass Formation," Science, New Series, vol. 267, No. 5206, Mar. 31, 1995, pp. 1935-1939.
Tallant, D. R. et al., "The Effects of Tensile Stress on the Raman Spectrum of the Silica Glass," Journal of Non-Crystalline Solids, vol. 106, 1988, pp. 380-383.
Tandon, Rajan et al., "Controlling the Fragmentation Behavior of Stressed Glass," Fracture Mechanics of Ceramics, vol. 14, 2005, pp. 77.
Tomlinson, R., G. Calvert, and A. Conway, "A Photoelastic Investigation Into Spontaneous Glass Fracture", Proceedings of the XIth International Congress and Exposition, (Jun. 2008) 8 pgs.
Varughese, Binoy et al., "Effect of fictive temperature on mechanical strength of soda-lime glasses," Journal of Non-Crystalline Solids, vol. 241, 1998, pp. 134-139.
Walrafen, G. E. et al., "Raman investigation of optical fibers under high tensile stress," Journal of Applied Physics, vol. 52, No. 4, Apr. 1981, pp. 2832-2836.
Wang et al.; "Glass and Hot Extrusion by me Module for 3D Additive Manufacturing"; IEEE, 2016; pp. 1167-1171.
Wang, Fei et al., "Pressure Raman effects and internal stress in network glasses," Physical Review B, vol. 71, 2005, 32 pages.
Weissmann, Rand D. Durkop, "A Novel Method for Measuring Stresses in Flat Glass", XV International Congress on Glass Leningrad 1898, Proceeding 3b, O. V. Mazurin, ed., pp. 217-220.
Yamane, Masayuki, "Chapter 3: Thermal Processing," Glass Engineering Handbook, Asakura Publishing Co. Ltd., Jul. 1999, pp. 410-417.
Yue, Y.Z. et al., "Determination of the fictive temperature for a hyperquenched glass," Chemical Physics Letters, vol. 357, Issues 1-2, May 3, 2002, pp. 20-24.
Zaccaria et al; "Thermal Healing of Realistic Flaws in Glass"; J. Mater. Civ. Eng 2016, 28(2) pp. 04015127-1-04015127-9.
Zaman, F. D. et al., "Cooling of a Plate with General Boundary Conditions," International Journal of Mathematics and Mathematical Sciences, vol. 23, No. 7, 2000, pp. 477-485.
De Grauw, C. J. et al., "Axial resolution of confocal Raman microscopes: Gaussian beam theory and practice," Journal of Microscopy, vol. 188, PI. 3, Dec. 1997, pp. 273-279.
Deschamps, T. et al., "Soda-lime silicate glass under hydrostatic pressure and indentation: a micro-Raman study," Abstract, 2011, 1 page.
Deschamps, T. et al., "Soda-lime silicate glass under hydrostatic pressure and indentation: a micro-Raman study," Journal of Physics: Condensed Matter, vol. 23, 2011, 7 pages.
Donald, I. W., "Review: Methods for improving the mechanical properties of oxide glasses," Journal of Materials Science, vol. 24, 1989, pp. 4177-4208.
Electronic Cooling Editors, "The Thermal Conductivity of Gases", Design, Materials, Adhesives, Substrates, No. 3, Technical Data, Test & Measurement, vol. 4, Gases, Thermal Conductivity, Sep. 1, 1998, 2 pages.

English Translation of CN104211288A, Performed by Phoenix Translations Jun. 2016.
Ernsberger, F. M., "Chapter 1: Elastic Properties of Glasses," In "Glass: Science and Technology," vol. 5, Elasticity and Strength in Glasses, Academic Press, Inc., May 28, 1980, pp. 1-19.
Ernsberger, F. M., "Chapter 4: Techniques of Strengthening Glasses," In "Glass: Science and Technology," vol. 5, Elasticity and Strength in Glasses, Academic Press, Inc., May 28, 1980, pp. 133-144.
European Patent Application No. 15757030 Office Action dated Jun. 23, 2021; 5 Pages; European Patent Office.
European Patent Application No. 15757030.0 Office Action dated Mar. 2, 2018; 5 Pages; European Patent Office.
European Patent Application No. 16750337.4 Office Action dated Jan. 24, 2020; 4 Pages; European Patent Office.
EUROPTEC; "Themal Tempering"; EUROPTEC GMBH, DIC, Jun. 11, 2014; www.europtec.de.
Everall, Neil et al., "Optimizing Depth Resolution in Confocal Raman Microscopy: A Comparison of Metallurgical, Dry Corrected, and Oil Immersion Objectives," Applied Sprectroscopy, vol. 61, No. 3, 2007, pp. 251-259.
Everall, Neil J., "Confocal Raman Microscopy: Why the Depth Resolution and Spatial Accuracy Can Be Much Worse then You Think," Applied Spectroscopy, vol. 54, No. 10, 2000, pp. 1515-1520.
Fajans, Kasimir et al., "Properties and Structures of Vitreous and Crystalline Boron Oxide," Journal of the American Chemical Society, vol. 74, No. 11, Jun. 5, 1952, pp. 2761-2768.
Fotheringham, Dr. Ulrich, "Lecture 1: Internet teaching set-up," IMI-NFG's MITT Course on Relaxation Processes in Glass and Polymers Lecture 1, 2010, 6 slides.
Fotheringham, Dr. Ulrich, "Lecture 2: Phenomenology of viscoelasticity & glass transition," IMI-NFG's MITT Course on Relaxation Processes in Glass and Polymers Lecture 2, 2010, 17 slides.
Fotheringham, Dr. Ulrich, "Lecture 5: Viscoelasticity I—Shear," IMI-NFG's MITT Course on Relaxation Processes in Glass and Polymers Lecture 5, 2010, 19 slides.
Fotheringham, Dr. Ulrich, "Lecture 6: Viscoelasticity II—Bulk Viscoelasticity," IMI-NFG's MITT Course on Relaxation Processes in Glass and Polymers Lecture 6, 2010, 16 slides.
Fotheringham, Dr. Ulrich, "Lecture 7: Viscoelasticity III—Dynamic Testing," IMI-NFG's MITT Course on Relaxation Processes in Glass and Polymers Lecture 7, 2010, 19 slides.
Fotheringham, Dr. Ulrich, "Lecture 8: Viscoelasticity IV—Important Application of Pre-Stressing," IMI-NFG's MITT Course on Relaxation Processes in Glass and Polymers Lecture 8, 2010, 12 slides.
Freiman, S. W., "Chapter 2: Fracture Mechanics of Glass," In "Glass: Science and Technology," vol. 5, Elasticity and Strength in Glasses, Academic Press, Inc., May 28, 1980, pp. 21-78.
Frick, B. et al., "The Microscopic Basis of the Glass Transition in Polymers from Neutron Scattering Studies," Science, vol. 267, Mar. 31, 1995, pp. 1939-1945.
Galeener, Frank L., "Raman and ESR Studies of the Thermal History of Amorphous $SiO_2$," Journal of Non-Crystalline Solids, vol. 71, 1985, pp. 373-386.
Gang, Zhang Ming, "Manufacturing and Properties of Glass Used in Construction," Guangdong Golden Glass Technologies Ltd, Dec. 27, 2002, 11 pages.
Gardon, Robert, "Calculation of Temperature Distributions in Glass Plates Undergoing Heat-Treatment," Journal of the American Ceramic Society, vol. 41, No. 6, Jun. 1958, pp. 200-209.
Gardon, Robert, "Chapter 5: Thermal Tempering of Glass," In "Glass: Science and Technology," vol. 5, Elasticity and Strength in Glasses, Academic Press, Inc., May 28, 1980, pp. 145-216.
Gardon, Robert, "Tempering Glass with Modulated Cooling Schedules," Journal of the American Ceramic Society, vol. 71, No. 10, Oct. 1988, pp. 876-878.
Gardon, Robert, "Variation of Densities and Refractive Indices in Tempered Glass," Journal of the American Ceramic Society, vol. 61, No. 3-4, Mar.-Apr. 1978, pp. 143-146.
Glass, Jill et al., "Processing and Properties of Ion Exchanged Glasses," Glass and Optical Materials Division Fall Meeting, Nov. 6-12, 2004, Cape Canaveral, FL, 33 slides.

(56) References Cited

OTHER PUBLICATIONS

Glass, S. J. et al., "Stressed Glass Technology for Actuators and Removable Barrier Applications," Sandia Report SAND2007-4106, Sandia National Laboratories, Jul. 2007, 18 pages.
Gomez, Sinue et al., "69.2: Designing Strong Glass for Mobile Devices," SID Symposium Digest of Technical Papers, vol. 40, No. 1, Jan. 2009, pp. 1045-1048.
Gross, T.M., "Deformation and cracking behavior of glasses indented with diamond tips of various sharpness," Journal of Non-Crystalline Solids, vol. 358, Issue 24, Dec. 12, 2012, pp. 3445-3452.
Guillemet, C., "Annealing and Tempering of Glass," Journal of Non-Crystalline Solids, vol. 123, 1990, pp. 415-426.
Gulati, Suresh T., "Frangibility of Tempered Soda-Lime Glass Sheet," Glass Processing Days, 13-15, Sep. 1997, pp. 72-76.
Gupta, Prabhat K. et al., "The laboratory glass transition," The Journal of Chemical Physics, vol. 126, 2007, 9 pages.
Gupta, Prabhat, "Landscape Approach to Glass Transition and Relaxation: Basic Concepts (contd.)," IMI-NFG's MITT Course on Relaxation Processes in Glass Lecture 18, Mar. 25, 2010, 23 slides.
Gupta, Prabhat, "Landscape Approach to Glass Transition and Relaxation: Four lectures on 'The Landscape Approach,'" IMI-NFG's MITT Course on Relaxation Processes in Glass Lecture 17, Mar. 23, 2010, 28 slides.
Gupta, Prabhat, "Landscape Approach to Glass Transition and Relaxation: Liquid to Glass Transition," IMI-NFG's MITT Course on Relaxation Processes in Glass Lecture 19, Mar. 30, 2010, 25 slides.
Gupta, Prabhat, "Landscape Approach to Glass Transition and Relaxation: Relaxation in the glassy state," IMI-NFG's Min Course on Relaxation Processes in Glass Lecture 20, Apr. 1, 2010, 20 slides.
Gy, Rene, "Ion exchange for glass strengthening," Materials Science and Engineering B, vol. 149, 2008, pp. 159-165.
Hara, Morihisa et al., "Vickers Hardness of Toughened Sheet Glass," Reports of the Research Laboratory, Asahi Glass Co., Ltd., vol. 12, No. 2, 1962, pp. 99-104.
Hibino, Yoshinori et al., "Raman study on silica optical fibers subjected to high tensile stress," Applied Physics Letters, vol. 47, No. 8, Oct. 15, 1985, pp. 812-814.
Hodge, Ian M., "Physical Aging in Polymer Glasses," Science, vol. 267, , No. 5206, Mar. 31, 1995, pp. 1945-1947.
Hrma et al.; "Thermal Healing of Cracks in Glass"; Journal of Non-Crystalline Solids; vol. 102, (1988); pp. 88-94.
Huang, Liping et al., "Polymorphic transitions in vitreous B2O3 under pressure," Journal of Physics: Condensed Matter, vol. 20, 2008, 8 pages.
Hubert, Mathieu, "Lecture 9: Annealing and tempering," IMI-NFG Course on Processing in Glass—Lecture 9, Feb. 19, 2015, 72 slides.
Hutchins, J. and R. Harrington, "Glass", Kirk-Othmer Encyclopedia of Chemical Technology, 2nd Edition, 10 pp. 533-604.
International Preliminary Report on Patentability of the International Searching Authority; PCT/US15/42955; dated Feb. 9, 2017; 9 Pages; European Patent Office.
International Preliminary Report on Patentability of the International Searching Authority; PCT/US16/45022; dated Feb. 8, 2018; 15 Pages; European Patent Office.

\* cited by examiner

GLASSES WITH IMPROVED TEMPERING CAPABILITIES

This application claims the benefit of priority under 35 U.S.C. § 371 of International Application No. PCT/US2018/047859, filed on Aug. 24, 2018, which claims the benefit of priority under 35 U.S.C. § 119 of U.S. Provisional Application Ser. No. 62/549,507 filed on Aug. 24, 2017, the content of each of which is relied upon and incorporated herein by reference in their entirety.

FIELD OF DISCLOSURE

The disclosure relates to highly temperable glass compositions. More particularly, the disclosure relates to glasses having improved tempering when compared to common soda lime glasses. Even more particularly, the disclosure relates to glass compositions with high coefficients of thermal expansion and high Young's moduli for use with a thermal tempering process.

BACKGROUND

In thermal tempering, a glass product is heated to near the softening temperature and then rapidly quenched. As a result, the glass will possess a lower surface temperature than the interior during cooling. The temperature difference is maintained until the surface of the glass cools to room temperature. As the center of the glass cools more slowly to room temperature it contracts to a smaller specific volume while the high specific volume of the surface layer remains unchanged. This leads to a surface compressive layer that gives tempered glass its strength. The difference in specific volume is in majority due to differences in the thermal expansion of the glass upon cooling, while to a lesser extent from a fictive temperature difference between the surface and the bulk. To a first approximation, the stress distribution in thermally tempered glass can be represented by a simple parabola, with the magnitude of the surface compressive stress approximately equal to twice the center tension.

Thermally tempered glass, sometimes called safety glass, is often applied in situations where safe fracture behavior is required to prevent injury in the case of failure, being used to strengthen automobile side and rear windows, as well as object such as shower doors. It is desired that when thermally tempered glass breaks, unlike annealed glass, it shatters into rock-salt like pieces which do not have sharp edges or needle-like shapes. It is for this reason that characterizing the fracture behavior of thermally tempered glass is of paramount importance. The desired fracture behavior is called "dicing" and occurs when the glass has achieved full temper.

In addition to the safety aspect of thermally tempered glass, tempering strengthens the glass, making it more damage resistant and durable. Because of the increased durability, tempered glass can be used in applications where normal glass would quickly break—for example, automotive windshields, where the glass may impacted by rocks or other hard materials. Due to the increase in glass use in architectural, automotive, and electronic device applications, there is a continued need for strengthened glasses having improved tempering capabilities.

DETAILED DESCRIPTION

In the following description, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off; measurement error and the like, and other factors known to those of skill in the art. It is noted that the terms "substantially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "free of $Al_2O_3$" is one in which $Al_2O_3$ is not actively added or batched into the glass, but may be present in very small amounts as a contaminant (e.g., 500, 400, 300, 200, or 100 parts per million (ppm) or less or).

Unless otherwise specified, all compositions are expressed in terms of mole percent (mol %). Coefficients of thermal expansion (CTE) are expressed in terms of $10^{-7}/°$ C. and represent a value measured over a temperature range from 25° C. to 300° C., unless otherwise specified. The low temperature CTE (LTCTE) is measured at 25° C. and expressed in terms of $10^{-7}/°$ C. The high temperature CTE (HTCTE) is measured at 300° C. and expressed in terms of $10^{-7}/°$ C. The sum of the LTCTE and the HTCTE is expressed in terms of $10^{-7}/°$ C. The density in terms of grams/cm$^3$ was measured via the Archimedes method (ASTM C693). Young's modulus, shear modulus, and Poisson's Ratio were measured via the ASTM C623 standard.

Glass Compositions

In thermal tempering, a glass product is heated to near the softening temperature and then rapidly quenched. As a result, the glass will possess a lower surface temperature than the interior during cooling. The temperature difference is maintained until the surface of the glass cools to room temperature. As the center of the glass cools more slowly to room temperature it contracts to a smaller specific volume while the high specific volume of the surface layer remains unchanged. This leads to a surface compressive layer that gives tempered glass its strength. The difference in specific volume is due to a combination of differences in the thermal expansion of the glass upon cooling and from a fictive temperature difference between the surface and the bulk. To a first approximation, the stress distribution in thermally tempered glass can be represented by a simple parabola, with the magnitude of the surface compressive stress approximately equal to twice the center tension.

When thermally tempered glass breaks, unlike annealed glass, it shatters into rock-salt like pieces which do not have sharp edges or needle-like shapes. This behavior is particularly useful for situations where safe fracture behavior is necessary and it is for this reason that characterizing the fracture behavior of thermally tempered glass is of paramount importance. The desired fracture behavior is called "dicing" and occurs when the glass has achieved full temper. The dicing threshold of tempered glass is an arbitrarily defined fracture behavior which can be considered "safe" to the user in the event of glass failure. Standards exist worldwide such as ASTM C1048 and ANSI Z97.1 in the United States, EN12150-1 in Europe, GOST 5727-88 in Russia, JIS R 3206 in Japan, and GB 15763.2 in China (all of which are hereby incorporated by reference). The standards are nearly identical across countries in that a fragmented piece of tempered soda-lime glass is required to contain at least 30-40 fragments in an area of 50 mm×50 mm (1.6 fragments/cm$^2$) for thick glasses >3 mm, while Japanese standards in particular require at least 60 fragments in the case of thinner glass.

It is of interest to predict the ability of a glass composition to produce stresses during thermal tempering. The simplest approximation one can make in forming a more general expression is to assume that for any chosen combination of glass thickness and quenching rate, the stress formed due to thermal strain is a fraction of the maximum possible. Therefore a general expression for the compressive tempering stress formed when quenched from a constant viscosity can be expressed as:

$$\sigma_{Cs} \sim C(h,t,\eta) + \Psi(E, \alpha_{CTE}^S, \alpha_{CTE}^L, T_{soft}, T_{strain})$$

where $\alpha^S$ is the CTE of the glass in solid form, $\alpha^L$ is the CTE of the glass in liquid form, $T_{soft}$ is the softening point temperature, $T_{strain}$ is the strain point temperature, and the constant, $\Psi$, is a material property called the "temperability parameter" and is representative of the maximum thermal strain that can be formed if the surface was frozen upon quenching. The maximum thermal strain can be roughly estimated by a 2-step integration of the thermal expansion as a function of temperature and general glass properties. The thermal expansion coefficient (CTE) is assumed to be a constant from room temperature to the strain point, and then constant again from the strain point to softening. With this in mind and with the assumption that room temperature is close to 0° C., a more general "temperability parameter" can be expressed as:

$$\Psi = E^*[T_{strain}^*\alpha_{CTE}^s + \alpha_{CTE}^L*(T_{soft} - T_{strain})]$$

where E is in GPa, temperatures are given in ° C., and $\alpha$ is in ° C.$^{-1}$. It can be seen that this expression contains a more general form of the volumetric strain calculated using the strain point of the glass between glassy and liquid behavior.

By measuring a few standard properties for a given glass, it is possible to estimate the temper stresses that would be expect to form if the constant, $C(h,t,\eta)$, is known. This constant has been evaluated using modeling for a wide range of known compositions, and from the calculation of $\Psi$, the relative temperability of various glass compositions can be quickly compared to one another. When the temperabilities of a variety glass compositions are calculated, the results show that various combinations of properties can reach a similar endpoint and that glasses vast differences in the compositions and properties can be nearly indistinguishable in terms of temperability.

The glasses disclosed herein have high coefficients of thermal expansion and high Young's moduli and can be used with a thermal tempering process to obtain improved tempering when compared to commercially available glasses. The glasses described herein are needed to satisfy a growing demand for stronger but thinner thermally strengthened glasses for commercial electronics, automotive and architectural applications where durability and/or scratch resistance are desired along with a "safe" break pattern. As glass becomes thinner, it becomes harder to produce any thermal tempering stresses at all and the central tension required for a safe 'dicing' fracture pattern increases—producing a compound challenge. Developing glasses which produce enhanced temper stresses can help to meet this challenge. Additionally, the glasses must also retain a significant chemical durability, as they will likely be exposed to the elements for extended periods of time.

It has been found that glasses having temperability parameters, $\Psi$, of 0.8 or higher, 0.85 or higher, or even 0.9 or higher, are capable of increased thermal tempering. In some embodiments, to improve temperability, it has been found that the low temperature coefficient of thermal expansion (LTCTE) should be $5.5 \times 10^{-7}/°$ C. or greater. In some embodiments, it has been found that the high temperature coefficient of thermal expansion (HTCTE) should be $27 \times 10^{-7}/°$ C. or greater. In some embodiments, it has been found that in order to improve temperability, the sum of the LTCTE and HTCTE should be greater than $35 \times 10^{-7}/°$ C., $37 \times 10^{-7}/°$ C., or $40 \times 10^{-7}/°$ C. The invention is a novel glass composition space that has high coefficients of thermal expansion and Young's modulus. In some embodiments, it has been found that glass compositions have improved temperability when the Young's modulus is greater than 67 GPa and the temperability factor is greater than or equal to 0.75 (The approximate value of commercially available soda-lime glass).

In some embodiments, the glass comprises a combination of $SiO_2$, $Na_2O$ or $K_2O$, $Al_2O_3$, $B_2O_3$ or ZnO, and alkaline earth oxides. For example, embodiments may comprise from 60 mol % to 72 mol % $SiO_2$ (60 mol %≤$SiO_2$≤72 mol %); from greater than 0 mol % $Al_2O_3$ (0 mol %<$Al_2O_3$); from greater than 0 mol % MgO (0 mol %<MgO); from greater than 0 mol % CaO (0 mol %<CaO); 6-16 mol % $Na_2O+K_2O$ (6 mol %≤$Na_2O+K_2O$≤16 mol %); 0-16 mol % $Na_2O$ (0 mol %≤$Na_2O$≤16 mol %); 0-16 mol % $K_2O$ (0 mol %≤$K_2O$≤16 mol %); and one or more of $B_2O_3$ or ZnO, wherein $B_2O_3$, when present, comprises 1-10 mol % (1 mol %≤$B_2O_3$≤10 mol %); and ZnO, when present, comprises 3-8 mol % (3 mol %≤ZnO≤8 mol %). Additional aspects of the various constituents that can make up the embodied compositions are detailed below.

In some embodiments, the glass comprises a combination of $SiO_2$, $Na_2O$ or $K_2O$, $Al_2O_3$, $B_2O_3$, and alkaline earth oxides. For example, embodiments may comprise from 60 mol % to 65 mol % $SiO_2$ (60 mol %≤$SiO_2$≤65 mol %); from 5 mol % to 10 mol % $Al_2O_3$ (5 mol %≤$Al_2O_3$≤10 mol %); from 3 mol % to 10 mol % MgO (3 mol %≤MgO≤10 mol %); from 5 mol % to 15 mol % CaO (5 mol %≤CaO≤15 mol %); 8-15 mol % $Na_2O+K_2O$ (8 mol %≤$Na_2O+K_2O$≤15 mol %); 0-15 mol % $Na_2O$ (0 mol %≤$Na_2O$≤15 mol %); 0 mol % to 15 mol % $K_2O$ (0 mol %≤$K_2O$≤15 mol %); and 1.5 mol % to 6 mol % $B_2O_3$ (1.5 mol %≤$B_2O_3$≤6 mol %).

Alternative embodiments may comprise from 65 mol % to 70 mol % $SiO_2$ (65 mol %≤$SiO_2$≤70 mol %); from >0 mol % to 5 mol % $Al_2O_3$ (>0 mol %≤$Al_2O_3$≤5 mol %); from 4 mol % to 8 mol % MgO (4 mol %≤MgO≤8 mol %); from 7 mol % to 11 mol % CaO (7 mol %≤CaO≤11 mol %); 9-14 mol % $Na_2O+K_2O$ (9 mol %≤$Na_2O+K_2O$≤14 mol %); 0-14 mol % $Na_2O$ (0 mol %≤$Na_2O$≤14 mol %); 0 mol % to 14 mol % $K_2O$ (0 mol %≤$K_2O$≤14 mol %); and 1 mol % to 6 mol % $B_2O_3$ (1 mol %≤$B_2O_3$≤6 mol %).

Still other embodiments may comprise from 65 mol % to 70 mol % $SiO_2$ (65 mol %≤$SiO_2$≤70 mol %); from >0 mol % to 5 mol % $Al_2O_3$ (>0 mol %≤$Al_2O_3$≤5 mol %); from 5 mol % to 10 mol % MgO (5 mol %≤MgO≤10 mol %); from 6 mol % to 13 mol % CaO (6 mol %≤CaO≤13 mol %); 10-16 mol % $Na_2O+K_2O$ (10 mol %≤$Na_2O+K_2O$ (16 mol %); 2-16 mol % $Na_2O$ (2 mol %≤$Na_2O$≤16 mol %); 0 mol % to 8 mol % $K_2O$ (0 mol %≤$K_2O$≤8 mol %); and 1 mol % to 6 mol % $B_2O_3$ (1 mol %≤$B_2O_3$≤6 mol %).

Still other embodiments may comprise from 65 mol % to 72 mol % $SiO_2$ (65 mol %≤$SiO_2$≤72 mol %); from 4 mol % to 10 mol % $Al_2O_3$ (4 mol %≤$Al_2O_3$≤10 mol %); from 3 mol % to 10 mol % MgO (3 mol %≤MgO≤10 mol %); from >0 mol % to 13 mol % CaO (0 mol %≤CaO≤13 mol %); 10-16 mol % $Na_2O+K_2O$ (10 mol %≤$Na_2O+K_2O$≤16 mol %); 10-16 mol % $Na_2O$ (10 mol %≤$Na_2O$≤16 mol %); 0 mol % to 6 mol % $K_2O$ (0 mol %≤$K_2O$≤6 mol %); and 1.5 mol % to 8 mol % $B_2O_3$ (1.5 mol %≤$B_2O_3$≤8 mol %).

$SiO_2$, along with $Al_2O_3$, $B_2O_3$, $P_2O_5$, $ZrO_2$ and $SnO_2$, are network formers when present in the glass. $SiO_2$, which is the largest oxide component of the glass, may be included to provide high temperature stability and chemical durability. In some embodiments, the glass can comprise from 60 to 72 mol % $SiO_2$. In some embodiments, the glass can comprise from 60 to 65 mol % $SiO_2$. In some embodiments, the glass can comprise from 65 to 72 mol % $SiO_2$. In some embodiments, the glass can comprise from 65-70 mol % $SiO_2$. In some embodiments, the glass can comprise 60 to 72 mol %, 63 to 72 mol %, 65 to 72 mol %, 68 to 72 mol %, 60 to 70 mol %, 63 to 70 mol %, 65 to 70 mol %, 68 to 70 mol %, 60 to 68 mol %, 63 to 68 mol %, 65 to 68 mol %, 60 to 65 mol %, 63 to 65 mol %, or 60 to 63 mol % $SiO_2$. In some embodiments, the glass comprises 60, 61, 62, 63, 64, 65, 66, 67, 68, 69, 70, 71, or 72 mol % $SiO_2$.

$Al_2O_3$ may influence the structure of the glass and, additionally, lower the liquidus temperature and coefficient of thermal expansion, or enhance the strain point. In some embodiments, the glass can comprise greater than 0 mol % $Al_2O_3$. In some embodiments, the glass can comprise from >0 to 12 mol % $Al_2O_3$. In some embodiments, the glass can comprise from >0 to 5 mol %, 4 to 10 mol %, 5 to 10 mol % $Al_2O_3$ or >0 to 3 mol % $Al_2O_3$. In some embodiments, the glass can comprise from 0.5 to 4 mol % $Al_2O_3$. In some embodiments, the glass can comprise from >0 to 12 mol %, >0 to 10 mol %, >0 to 8 mol %, >0 to 6 mol %, >0 to 4 mol %, >0 to 2 mol %, 1 to 12 mol %, 1 to 10 mol %, 1 to 8 mol %, 1 to 6 mol %, 1 to 4 mol %, 1 to 2 mol %, 3 to 8 mol %, 3 to 6 mol %, 3 to 10 mol %, 3 to 12 mol %, 5 to 8 mol %, 5 to 10 mol %, 5 to 12 mol %, 7 to 12 mol %, 7 to 10 mol %, or 8 to 10 mol % $Al_2O_3$. In some embodiments, the glass can comprise about >0, 1, 2, 3, 4, 5, 6, 7, 8, 9, 10, 11 or 12 mol % $Al_2O_3$.

Without being bound by theory, it is believed that incorporating $B_2O_3$ into the glasses described herein impacts the coefficient of thermal expansion, especially at high temperatures, and improves the temperability of the glasses. In some embodiments, the glass can comprise 1 mol % to 10 mol % $B_2O_3$. In some embodiments, the glass can comprise from 1 mol % to 8 mol % or from 1 mol % to 6 mol % $B_2O_3$. In some embodiments, the glass can comprise from about 1.5 to 8 mol % $B_2O_3$ or 1.5 to 6 mol % $B_2O_3$. In some embodiments, the glass can comprise from 1 to 4 mol % $B_2O_3$. In some embodiments, the glass can comprise from 1 to 10 mol %, 1.5 to 10 mol %, 2 to 10 mol %, 4 to 10 mol %, 1 to 8 mol %, 1.5 to 8 mol %, 2 to 8 mol %, 4 to 8 mol %, 1 to 6 mol %, 1.5 to 6 mol %, 2 to 6 mol %, 4 to 6 mol %, 1 to 4 mol %, 1.5 to 4 mol %, 2 to 4 mol %, 1.5 to 3 mol %, or 1 to 3 mol % $B_2O_3$. In some embodiments, the glass can comprise about 0, >0, 1, 2, 3, 4, or 5 mol % $B_2O_3$.

Zinc oxide, ZnO, may be present and influence the glass properties, including the Young's modulus. In some embodiments, when ZnO is present, the glass can comprise 3 to 8 mol % $ZrO_2$ or, in some embodiments, from 3 to 5 mol % ZnO. In some embodiments, the glass can comprise 3, 4, 5, 6, 7, or 8 mol % ZnO.

Without wanting to be bound by theory, it is believed that in some embodiments, the both ZnO and $B_2O_3$ may have similar effects on the material properties. In some embodiments, when $B_2O_3$ is present in the glass, the glass is free of ZnO. Alternatively, in some embodiments, when ZnO is present in the glass, the glass is free of $B_2O_3$.

Alkaline earth oxides may improve desirable properties in the materials, including influencing the Young's modulus and the coefficient of thermal expansion. In some embodiments, the glass comprises from >0 mol % to about 20 mol % MO (0 mol %≤MO≤20 mol %), where M is the sum of the alkaline earth metals Mg, Ca, Sr, and Ba, in the glass. In some embodiments, the glass can comprise from >0 to 18 mol % MO. In some embodiments, the glass can comprise from >0 to 16 mol % MO. In some embodiments, the glass can comprise about >0, 1, 2, 3, 4, 5, 6, 7, 8, 9, 10, 11, 12, 13, 14, 15, 16, 17, 18, 19, or 20 mol % MO.

In some embodiments, the glasses comprise MgO, CaO, or SrO. In some embodiments, the glass can comprise greater than 0 mol % MgO. In some embodiments, the glass can comprise from >0 to 10 mol % MgO. In some embodiments, the glass can comprise from 3 to 10 mol %, 5 to 10 mol %, 5 to 8 mol % MgO. In some embodiments, the glass can comprise from >0 to 10 mol %, >0 to 8 mol %, >0 to 6 mol %, >0 to 4 mol %, >0 to 2 mol %, 1 to 10 mol %, 1 to 8 mol %, 1 to 6 mol %, 1 to 4 mol %, 1 to 2 mol %, 3 to 8 mol %, 3 to 6 mol %, 3 to 10 mol %, 5 to 8 mol %, 5 to 10 mol %, 7 to 10 mol %, or 8 to 10 mol % MgO. In some embodiments, the glass can comprise about >0, 1, 2, 3, 4, 5, 6, 7, 8, 9, or 10 mol % MgO.

In some embodiments, the glass can comprise greater than 0 mol % CaO. In some embodiments, the glass can comprise from >0 to 15 mol % CaO. In some embodiments, the glass can comprise from >0 to 5 mol %, 6 to 13 mol %, 5 to 15 mol %, 7 to 13 mol %, 7 to 11 mol %, 8 to 12 mol % CaO. In some embodiments, the glass can comprise from >0 to 15 mol %, >0 to 13 mol %, >0 to 11 mol %, >0 to 9 mol %, >0 to 7 mol %, >0 to 5 mol %, 1 to 15 mol %, 1 to 13 mol %, 1 to 11 mol %, 1 to 9 mol %, 1 to 7 mol %, 1 to 5 mol %, 3 to 15 mol %, 3 to 13 mol %, 3 to 11 mol %, 3 to 9 mol %, 3 to 7 mol %, 3 to 5 mol %, 5 to 15 mol %, 5 to 13 mol %, 5 to 11 mol %, 5 to 9 mol %, 5 to 7 mol %, 7 to 15 mol %, 7 to 13 mol %, 7 to 11 mol %, 7 to 9 mol %, 9 to 15 mol %, 9 to 13 mol %, 9 to 11 mol %, 11 to 15 mol %, or 11 to 13 mol % CaO. In some embodiments, the glass can comprise about >0, 1, 2, 3, 4, 5, 6, 7, 8, 9, 10, 11, 12, 13, 14, or 15 mol % CaO.

SrO may be present in some embodiments and in such embodiments, the glass can comprise from 0 to 5 mol % SrO. In some embodiments, the glass can comprise from >0 to 5 mol % SrO. In some embodiments, the glass can comprise from about >0 to 3.5 mol % SrO or 0.2 to 3 mol % SrO. In some embodiments, the glass can comprise from 1 to 4 mol % SrO. In some embodiments, the glass can comprise from 0.2 to 5 mol %, 0.2 to 4 mol %, 0.2 to 3 mol %, 0.2 to 2 mol %, >0 to 5 mol %, >0 to 4 mol %, >0 to 3 mol %, >0 to 2 mol %, 1 to 5 mol %, 1 to 4 mol %, or 1 to 3 mol % SrO. In some embodiments, the glass can comprise about 0, >0, 1, 2, 3, 4, or 5 mol % SrO.

$Na_2O$ and $K_2O$ may improve the temperability of the glass and influence the coefficient of thermal expansion, especially at low temperatures. In some embodiments, the glass can comprise from 0 to 16 mol % $Na_2O$. In some embodiments, the glass can comprise >0 to 15 mol % $Na_2O$. In some embodiments, the glass can comprise 10 to 16 mol % $Na_2O$. In some embodiments, the glass can comprise 2 to 16 mol % $Na_2O$. In some embodiments, the glass can comprise from 0 to 16 mol %, 0 to 15 mol %, 0 to 14 mol %, 0 to 10 mol %, 0 to 8 mol %, 0 to 5 mol %, >0 to 16 mol %, >0 to 15 mol %, >0 to 14 mol %, >0 to 10 mol %, >0 to 8 mol %, >0 to 5 mol %, 2 to 16 mol %, 2 to 15 mol %, 2 to 14 mol %, 2 to 10 mol %, 2 to 8 mol %, 2 to 5 mol %, 5 to 16 mol %, 5 to 15 mol %, 5 to 14 mol %, 5 to 10 mol %, 5 to 8 mol %, 8 to 16 mol %, 8 to 15 mol %, 8 to 14 mol %, 8 to 10 mol %, 10 to 16 mol %, 10 to 15 mol %, or 10 to 14 mol % $Na_2O$. In some embodiments, the glass can comprise 0, >0, 1, 2, 3, 4, 5, 6, 7, 8, 9, 10, 11, 12, 13, 14, 15, or 16 mol % $Na_2O$.

In some embodiments, the glass can comprise from 0 to 16 mol % $K_2O$. In some embodiments, the glass can comprise >0 to 15 mol % $K_2O$. In some embodiments, the glass can comprise 0 to 8 mol % $K_2O$. In some embodiments, the glass can comprise 0 to 6 mol % $K_2O$. In some embodiments, the glass can comprise from 0 to 16 mol %, 0 to 15 mol %, 0 to 14 mol %, 0 to 10 mol %, 0 to 8 mol %, 0 to 5 mol %, >0 to 16 mol %, >0 to 15 mol %, >0 to 14 mol %, >0 to 10 mol %, >0 to 8 mol %, >0 to 5 mol %, 2 to 16 mol %, 2 to 15 mol %, 2 to 14 mol %, 2 to 10 mol %, 2 to 8 mol %, 2 to 5 mol %, 5 to 16 mol %, 5 to 15 mol %, 5 to 14 mol %, 5 to 10 mol %, 5 to 8 mol %, 8 to 16 mol %, 8 to 15 mol %, 8 to 14 mol %, 8 to 10 mol %, 10 to 16 mol %, 10 to 15 mol %, or 10 to 14 mol % $K_2O$. In some embodiments, the glass can comprise 0, >0, 1, 2, 3, 4, 5, 6, 7, 8, 9, 10, 11, 12, 13, 14, 15, or 16 mol % $K_2O$.

In some embodiments, the total amount of the alkalis $Na_2O$ and $K_2O$ is important to the glass properties. In some embodiments, the glass can comprise 6 to 16 mol % $Na_2O+K_2O$. In some embodiments, the glass can comprise 8 to 16 mol % $Na_2O+K_2O$. In some embodiments, the glass can comprise 8 to 15 mol % $Na_2O+K_2O$. In some embodiments, the glass can comprise 10 to 16 mol % $Na_2O+K_2O$. In some embodiments, the glass can comprise 9 to 14 mol % $Na_2O+K_2O$. In some embodiments, the glass can comprise from 6 to 16 mol %, 8 to 16 mol %, 10 to 16 mol %, 6 to 15 mol %, 8 to 15 mol %, 10 to 15 mol %, 6 to 14 mol %, 8 to 14 mol %, 10 to 14 mol %, 6 to 12 mol %, 8 to 12 mol %, 10 to 12 mol %, 6 to 10 mol %, 8 to 10 mol %, or 6 to 8 mol % $Na_2O+K_2O$. In some embodiments, the glass can comprise 6, 7, 8, 9, 10, 11, 12, 13, 14, 15, or 16 mol % $Na_2O+K_2O$.

$Na_2O$ can be useful in the glass for ion exchange and chemical tempering. In some embodiments, the glass comprises from 0 mol % to about 5 mol % $Na_2O$ (0 mol %≤$Na_2O$≤5 mol %). In some embodiments, the glass can comprise from greater than 0 to 5 mol % $Na_2O$. In some embodiments, the glass can comprise from about 0 to 3 mol % $Na_2O$ or >0 to 3 mol % $Na_2O$. In some embodiments, the glass can comprise from 0.5 to 4 mol % $Na_2O$. In some embodiments, the glass can comprise from 0 to 5 mol %, 0 to 4 mol %, 0 to 3 mol %, 0 to 2 mol %, >0 to 5 mol %, >0 to 4 mol %, >0 to 3 mol %, >0 to 2 mol %, 1 to 5 mol %, 1 to 4 mol %, or 1 to 3 mol % $Na_2O$. In some embodiments, the glass can comprise about 0, >0, 1, 2, 3, 4, or 5 mol % $Na_2O$.

$K_2O$ may also be useful in ion exchange and may be present in the glass at amounts from 0 mol % to about 10 mol % $K_2O$ (0 mol %≤$K_2O$≤10 mol %). In some embodiments, the glass can comprise from >0 to 10 mol % $K_2O$. In some embodiments, the glass can comprise from about 0 to 5 mol % $K_2O$ or >0 to 3 mol % $K_2O$. In some embodiments, the glass can comprise from 0.5 to 4 mol % $K_2O$. In some embodiments, the glass can comprise from 0 to 10 mol %, 0 to 8 mol %, 0 to 5 mol %, 0 to 4 mol %, 0 to 3 mol %, >0 to 10 mol %, >0 to 8 mol %, >0 to 5 mol %, >0 to 3 mol %, 1 to 10 mol %, 1 to 8 mol %, 1 to 5, 1 to 4 mol %, 1 to 3 mol %, 2 to 10 mol %, 2 to 8 mol %, or 2 to 4 $K_2O$. In some embodiments, the glass can comprise about 0, >0, 1, 2, 3, 4, 5, 6, 7, 8, 9, or 10 mol % $K_2O$.

Alkaline earth oxides may provide advantages for ion exchange in the glass, along with improving other properties in the materials. In some embodiments, the glass comprises from 0 mol % to about 10 mol % MO (0 mol %≤MO≤10 mol %), where M is the sum of the alkaline earth metals Mg, Ca, Sr, and Ba, in the glass. In some embodiments, the glass can comprise from 0 to 8 mol % MO. In some embodiments, the glass can comprise from 0 to 5 mol % MO. In some embodiments, the glass can comprise from 1 to 8 mol % MO. In some embodiments, the glass can comprise from 0 to 10 mol %, 0 to 8 mol %, 0 to 6 mol %, 0 to 4 mol %, 1 to 10 mol %, 1 to 8 mol %, 1 to 6 mol % 2 to 10 mol %, 2 to 8 mol %, or 2 to 6 mol % MO. In some embodiments, the glass can comprise about >0, 1, 2, 3, 4, 5, 6, 7, 8, 9, or 10 mol % MO.

In some embodiments, the glasses above further comprise a coloring component. The coloring component may comprise, for example, $Fe_2O_3$, $V_2O_5$, $Cr_2O_3$, $TiO_2$, $MnO_2$, NiO, ZnO, CuO, NiO, $Co_3O_4$, rare earth oxides, and combinations thereof. In some cases, the total mol % of coloring component is from 0 to 4 mol %, 0 to 3 mol %, 0 to 2 mol %, 0 to 1 mol %, >0 to 0.1, >0 to 0.5, >0 to 1, >0 to 2, >0 to 3, or >0 to 4 mol %.

Additional components can be incorporated into the glass to provide additional benefits or may be incorporated as contaminants typically found in commercially-prepared glass. For example, additional components can be added as fining agents (e.g., to facilitate removal of gaseous inclusions from melted batch materials used to produce the glass)

and/or for other purposes. In some embodiments, the glass may comprise one or more compounds useful as ultraviolet radiation absorbers. In some embodiments, the glass can comprise 3 mol % or less MnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. In some embodiments, the glass can comprise from 0 to about 3 mol %, 0 to about 2 mol %, 0 to about 1 mol %, 0 to 0.5 mol %, 0 to 0.1 mol %, 0 to 0.05 mol %, or 0 to 0.01 mol % MnO, ZnO, $Nb_2O_5$, $MoO_3$, $Ta_2O_5$, $WO_3$, $SnO_2$, $Fe_2O_3$, $As_2O_3$, $Sb_2O_3$, Cl, Br, or combinations thereof. In some embodiments, the glass can comprise from 0 to about 3 mol %, 0 to about 2 mol %, 0 to about 1 mol %, 0 to about 0.5 mol %, 0 to about 0.1 mol %, 0 to about 0.05 mol %, or 0 to about 0.01 mol % $SnO_2$ or $Fe_2O_3$, or combinations thereof. The glasses, according to some embodiments, can also include various contaminants associated with batch materials and/or introduced into the glass by the melting, fining, and/or forming equipment used to produce the glass.

Non-limiting examples of precursor glasses for forming the embodied glasses are listed in Table 1, wherein the values of the components are listed in mol %.

TABLE 1

| | | Sample | | | | | | |
|---|---|---|---|---|---|---|---|---|
| | Glaverbel soda-lime | A | B | C | D | E | F | G |
| $SiO_2$ (mol %) | 70.06 | 68.10 | 67.22 | 65.43 | 67.11 | 69.03 | 68.48 | 60.40 |
| $B_2O_3$ (mol %) | 0.00 | 1.77 | 3.41 | 5.34 | 4.31 | 3.13 | 5.06 | 1.98 |
| $Al_2O_3$ (mol %) | 1.17 | 0.95 | 0.96 | 0.96 | 0.99 | 1.01 | 0.97 | 8.71 |
| MgO (mol %) | 6.49 | 6.77 | 6.56 | 6.54 | 6.69 | 6.78 | 4.03 | 6.63 |
| CaO (mol %) | 8.69 | 9.06 | 9.01 | 8.98 | 9.21 | 9.44 | 8.95 | 9.11 |
| SrO (mol %) | 0.00 | 0.00 | 0.00 | 0.00 | 0.00 | 0.00 | 0.00 | 0.00 |
| $Na_2O$ (mol %) | 13.33 | 12.86 | 12.40 | 12.32 | 6.39 | 0.02 | 12.11 | 12.60 |
| $K_2O$ (mol %) | 0.25 | 0.50 | 0.43 | 0.43 | 5.30 | 10.60 | 0.40 | 0.47 |
| ZnO (mol %) | 0.00 | 0.00 | 0.00 | 0.00 | 0.00 | 0.00 | 0.00 | 0.00 |
| $SnO_2$ (mol %) | 0.22 | 0.02 | 0.00 | 0.00 | 0.01 | 0.00 | 0.01 | 0.09 |
| LTCTE ($10^{-7}$/° C.) | 8.8 | 8.65 | 8.47 | 8.42 | 8.47 | 8.16 | 8.20 | 8.4 |
| HTCTE ($10^{-7}$/° C.) | 27.0 | 33.80 | 39.20 | 44.60 | 43.50 | 31.90 | 43.00 | 32.40 |
| Young's Modulus (GPa) | 72.0 | 76.2 | 77.2 | 79.2 | 76.0 | 78.8 | 78.3 | 78.4 |
| Shear Modulus (GPa) | — | 31.2 | 31.9 | 32.2 | 31.0 | 32.3 | 32.1 | 32.0 |
| Poisson's Ratio | — | 0.219 | 0.212 | 0.229 | 0.225 | 0.222 | 0.219 | 0.226 |
| Strain Point (° C.) | 507 | 512 | 521 | 522 | 532 | 598 | 526 | 557 |
| Anneal Point (° C.) | 549 | 550 | 557 | 557 | 569 | 643 | 563 | 598 |
| Softening Point (° C.) | 728 | 714 | 713 | 705 | 733 | 829 | 716 | 774 |
| Density (g/cm$^3$) | 2.540 | 2.519 | 2.528 | 2.535 | 2.509 | 2.471 | 2.519 | 2.539 |
| SOC (TPa$^{-1}$) | 2.720 | 2.730 | 2.698 | 2.696 | 2.728 | 2.820 | 2.769 | 2.868 |
| Refractive Index | 1.520 | 1.5236 | 1.5267 | 1.5292 | 1.5247 | 1.5172 | 1.5260 | 1.5272 |
| VFT - a | — | −1.469 | −1.103 | −1.086 | −1.601 | −1.736 | −1.234 | −1.881 |
| VFT - b | — | 3794.1 | 3054.6 | 2868.8 | 3916.3 | 4270.5 | 3207.9 | 4625.2 |
| VFT - $T_0$ | — | 301.9 | 367.7 | 379.2 | 313.1 | 376.8 | 352.2 | 286.4 |
| Liquidus Viscosity (Poise) | — | 11088 | 7677 | 4886 | 20712 | 40459 | 29243 | — |
| Temperability, ψ | 0.75 | 0.86 | 0.92 | 0.99 | 1.01 | 0.96 | 0.98 | 0.94 |
| HTCTE + LTCTE ($10^{-7}$/° C.) | 35.8 | 42.45 | 47.67 | 53.02 | 51.97 | 40.06 | 51.2 | 40.8 |

| | | Sample | | | | | | |
|---|---|---|---|---|---|---|---|---|
| | Glaverbel soda-lime | H | I | J | K | L | M | N |
| $SiO_2$ (mol %) | 70.06 | 58.76 | 56.86 | 57.23 | 57.70 | 59.66 | 70.39 | 70.50 |
| $B_2O_3$ (mol %) | 0.00 | 3.73 | 5.52 | 5.24 | 5.03 | 5.53 | 7.77 | 9.76 |
| $Al_2O_3$ (mol %) | 1.17 | 9.05 | 9.13 | 9.19 | 9.18 | 9.01 | 5.99 | 3.98 |
| MgO (mol %) | 6.49 | 6.52 | 6.50 | 6.52 | 6.45 | 3.94 | 7.23 | 7.03 |
| CaO (mol %) | 8.69 | 9.09 | 9.00 | 9.16 | 9.02 | 8.75 | 0.06 | 0.06 |
| SrO (mol %) | 0.00 | 0.00 | 0.00 | 0.00 | 0.00 | 0.00 | 0.00 | 0.00 |
| $Na_2O$ (mol %) | 13.33 | 12.32 | 12.44 | 6.52 | 0.10 | 12.54 | 8.47 | 8.57 |
| $K_2O$ (mol %) | 0.25 | 0.46 | 0.45 | 6.06 | 12.44 | 0.48 | 0.01 | 0.01 |
| ZnO (mol %) | 0.00 | 0.00 | 0.00 | 0.00 | 0.00 | 0.00 | 0.00 | 0.00 |
| $SnO_2$ (mol %) | 0.22 | 0.09 | 0.09 | 0.09 | 0.09 | 0.09 | 0.05 | 0.05 |
| LTCTE ($10^{-7}$/° C.) | 8.8 | 8.32 | 8.36 | 8.93 | 8.89 | 8.25 | 5.89 | 5.79 |
| HTCTE ($10^{-7}$/° C.) | 27.0 | 34.00 | 27.90 | 36.00 | 27.00 | 42.00 | 28.07 | 32.70 |
| Young's Modulus (GPa) | 72.0 | 78.3 | 78.3 | 75.8 | 68.0 | 77.6 | 69.71 | 70.74 |
| Shear Modulus (GPa) | — | 31.9 | 31.8 | 30.6 | 27.6 | 31.6 | 28.89 | 29.44 |
| Poisson's Ratio | — | 0.226 | 0.232 | 0.238 | 0.229 | 0.229 | 0.206 | 0.202 |
| Strain Point (° C.) | 507 | 543 | 536 | 541 | 589 | 537 | 543 | 532 |
| Anneal Point (° C.) | 549 | 584 | 576 | 583 | 634 | 577 | 587 | 575 |
| Softening Point (° C.) | 728 | 757 | 740 | 758 | — | 742 | 812 | 766 |
| Density (g/cm$^3$) | 2.540 | 2.536 | 2.535 | 2.52 | 2.486 | 2.521 | 2.363 | 2.363 |
| SOC (TPa$^{-1}$) | 2.720 | 2.783 | 2.792 | 2.843 | 2.861 | 2.737 | 3.398 | 3.345 |
| Refractive Index | 1.520 | 1.5289 | 1.5298 | 1.5266 | 1.5212 | 1.5264 | 1.4951 | 1.4964 |

TABLE 1-continued

| | | | | | | | | |
|---|---|---|---|---|---|---|---|---|
| VFT - a | — | −1.514 | −1.345 | −1.994 | −2.387 | −1.441 | −3.154 | −2.402 |
| VFT - b | — | 3916.1 | 3518.8 | 4730.7 | 5460.2 | 3873 | 9067.9 | 7058.4 |
| VFT - $T_0$ | — | 335.4 | 354.3 | 271.2 | 296 | 319.3 | −54.2 | 44.4 |
| Temperability, ψ | 0.75 | 0.94 | 0.94 | 0.81 | 0.99 | 0.82 | 0.75 | 0.76 |
| HTCTE + LTCTE ($10^{-7}$/° C.) | 35.8 | 42.32 | 36.26 | 44.93 | 35.89 | 50.25 | 33.96 | 38.49 |

| | Sample | | | | | | | |
|---|---|---|---|---|---|---|---|---|
| | Glaverbel soda-lime | O | P | Q | R | S | T | U |
| $SiO_2$ (mol %) | 70.06 | 70.53 | 70.70 | 70.71 | 70.55 | 63.11 | 62.26 | 63.12 |
| $B_2O_3$ (mol %) | 0.00 | 7.80 | 9.67 | 7.62 | 7.77 | 0 | 0 | 0 |
| $Al_2O_3$ (mol %) | 1.17 | 6.02 | 4.01 | 3.99 | 4.00 | 11.58 | 11.41 | 10.58 |
| MgO (mol %) | 6.49 | 4.97 | 5.06 | 7.01 | 8.98 | 0.00 | 0.00 | 0.00 |
| CaO (mol %) | 8.69 | 0.04 | 0.04 | 0.06 | 0.07 | 0.00 | 0.00 | 0.00 |
| SrO (mol %) | 0.00 | 0.00 | 0.00 | 0.00 | 0.00 | 0.00 | 0.00 | 0.00 |
| $Na_2O$ (mol %) | 13.33 | 10.54 | 10.42 | 10.51 | 8.54 | 16.43 | 16.81 | 16.41 |
| $K_2O$ (mol %) | 0.25 | 0.01 | 0.01 | 0.01 | 0.01 | 1.88 | 1.94 | 1.89 |
| ZnO (mol %) | 0.00 | 0.00 | 0.00 | 0.00 | 0.00 | 1.93 | 3.12 | 1.94 |
| $SnO_2$ (mol %) | 0.22 | 0.05 | 0.05 | 0.05 | 0.05 | 0.05 | 0.05 | 0.05 |
| LTCTE (($10^{-7}$/° C.) | 8.8 | 6.47 | 6.39 | 6.57 | 5.88 | 10.3 | 10.31 | 10.19 |
| HTCTE ($10^{-7}$/° C.) | 27.0 | 34.44 | 34.01 | 35.99 | 32.70 | 17.62 | 18.82 | 17.30 |
| Young's Modulus (GPa) | 72.0 | 70.05 | 71.50 | 72.19 | 71.91 | 66.19 | 67.78 | 65.22 |
| Shear Modulus (GPa) | — | 29.23 | 29.79 | 29.99 | 29.85 | 27.44 | 27.99 | 27.03 |
| Poisson's Ratio | — | 0.198 | 0.201 | 0.203 | 0.203 | 0.206 | 0.21 | 0.207 |
| Strain Point (° C.) | 507 | 532 | 522 | 531 | 545 | 615 | 605 | 628 |
| Anneal Point (° C.) | 549 | 576 | 564 | 573 | 584 | 672 | 661 | 688 |
| Softening Point (° C.) | 728 | 778 | 748 | 758 | 780 | 912 | 927 | 911 |
| Density (g/cm³) | 2.540 | 2.379 | 2.383 | 2.393 | 2.379 | 2.432 | 2.459 | 2.414 |
| SOC ($TPa^{-1}$) | 2.720 | 3.287 | 3.284 | 3.225 | 3.289 | 3.104 | 3.108 | 3.107 |
| Refractive Index | 1.520 | 1.497 | 1.4982 | 1.4991 | 1.4982 | 1.4902 | 1.4948 | 1.4862 |
| VFT - a | — | −2.120 | −1.385 | −2.166 | −2.528 | −2.656 | −2.515 | −1.732 |
| VFT - b | — | 6504.5 | 4601.5 | 6190.8 | 7167.1 | 7560.6 | 7279.9 | 5405.9 |
| VFT - $T_0$ | — | 89.2 | 231.8 | 112.9 | 62.2 | 90.7 | 109.2 | 273.5 |
| Temperability, ψ | 0.75 | 0.84 | 0.79 | 0.84 | 0.78 | 0.77 | 0.83 | 0.75 |
| HTCTE + LTCTE ($10^{-7}$/° C.) | 35.8 | 40.91 | 40.4 | 42.56 | 38.58 | 27.92 | 29.13 | 27.49 |

| | Sample | | | | | |
|---|---|---|---|---|---|---|
| | Glaverbel soda-lime | V | W | X | Y | Z |
| $SiO_2$ (mol %) | 70.06 | 63.29 | 60.87 | 65.43 | 62.23 | 62.53 |
| $B_2O_3$ (mol %) | 0.00 | 0.00 | 0.00 | 16.86 | 5.90 | 5.98 |
| $Al_2O_3$ (mol %) | 1.17 | 9.58 | 11.52 | 3.7 | 0.96 | 0.96 |
| MgO (mol %) | 6.49 | 0.00 | 0.00 | 0.00 | 6.49 | 6.37 |
| CaO (mol %) | 8.69 | 0.00 | 0.00 | 0.00 | 9.07 | 8.96 |
| SrO (mol %) | 0.00 | 0.00 | 0.00 | 3.06 | 0.00 | 0.00 |
| $Na_2O$ (mol %) | 13.33 | 16.34 | 16.63 | 6.47 | 12.79 | 12.64 |
| $K_2O$ (mol %) | 0.25 | 1.90 | 1.87 | 0 | 0.47 | 0.46 |
| ZnO (mol %) | 0.00 | 2.93 | 2.94 | 0 | 0.00 | 0.00 |
| $SnO_2$ (mol %) | 0.22 | 0.05 | 0.05 | 0.05 | 0.11 | 0.11 |
| $Fe_2O_3$ (mol %) | | | | | 0.03 | 0.05 |
| $TiO_2$ (mol %) | | | | | 1.96 | 1.93 |
| LTCTE ($10^{-7}$/° C.) | 8.8 | 10.45 | 10.08 | 6.22 | | |
| HTCTE ($10^{-7}$/° C.) | 27.0 | 17.02 | 18.00 | 39.36 | | |
| Young's Modulus (GPa) | 72.0 | 65.64 | 65.84 | 78.53 | | |
| Shear Modulus (GPa) | — | 27.37 | 27.17 | 32.41 | | |
| Poisson's Ratio | — | 0.199 | 0.213 | 0.212 | | |
| Strain Point (° C.) | 507 | 638 | 612 | 492 | | |
| Anneal Point (° C.) | 549 | 700 | 671 | 527 | | |
| Softening Point (° C.) | 728 | 931 | 907 | 673 | | |
| Density (g/cm³) | 2.540 | 2.425 | 2.442 | 2.432 | | |
| SOC ($TPa^{-1}$) | 2.720 | 3.149 | 3.149 | 3.105 | | |
| Refractive Index | 1.520 | 1.4867 | 1.4903 | 1.5116 | | |
| VFT - a | — | −0.116 | −2.665 | −0.779 | | |
| VFT - b | — | 2364 | 7338.2 | 2734.7 | | |
| VFT - $T_0$ | — | 629.2 | 118.9 | 347.9 | | |
| Temperability, ψ | 0.75 | 0.78 | 0.76 | 0.79 | | |
| HTCTE + LTCTE ($10^{-7}$/° C.) | 35.8 | 27.47 | 28.08 | 45.58 | | |

In addition to having high fracture toughness, the glasses described herein can have color and transparency/translucency properties that make them advantageous for a number of applications. The glasses of one or more embodiments may exhibit a substantially white, white-clear, gold or amber color, or other colors as well. In some embodiments, the glasses exhibit a color presented in SCE color space coordinates (determined from reflectance spectra measurements using a spectrophotometer, with illuminant D65 and specular reflectance excluded), of the following ranges: $a^*$=from about −5 to about −1; $b^*$=from about 5 to about 18; and $L^*$>83. In some applications, the glasses are transparent and quantitatively white to yellow-brown in color and are of particular interest in photovoltaic applications.

Color examples are shown in Table 2. The first four columns of the table have the color coordination of thin-line PV cell, and the color coordination when the glass is on the top of the PV cell (thickness of the glass is 2 mm or 4 mm). The last four columns are the color coordination for the glass itself.

| SCE color coordination | L* | a* | b* | SCE color coordination | L* | a* | b* |
|---|---|---|---|---|---|---|---|
| PV cell thin lines | 19.09 | 8.43 | −14.12 | | | | |
| Comp. Y (2 mm w/cell) | 15.03 | 6.14 | −8.62 | Comp. Y (2 mm) | 86.76 | −2.51 | 9.14 |
| Comp. Y (4 mm w/cell) | 13.69 | 4.48 | −5.54 | Comp. Y (4 mm) | 82.63 | −4.48 | 15.11 |
| Comp. Z (2 mm w/cell) | 14.96 | 7 | −10.28 | Comp. Z (2 mm) | 88.07 | −1.72 | 6.72 |
| Comp. Z (4 mm w/cell) | 13.73 | 5.56 | −7.65 | Comp. Z (4 mm) | 84.43 | −3.32 | 12.21 |
| SCI color | L* | a* | b* | SCI color coordination | L* | a* | b* |
| PV cell thin lines | 19.25 | 7.99 | −13.28 | | | | |
| Comp. Y (2 mm w/cell) | 38.56 | 1.66 | −2.85 | Comp. Y (2 mm) | 91.89 | −2.4 | 8.72 |
| Comp. Y (4 mm w/cell) | 37.43 | 0.66 | −0.52 | Comp. Y (4 mm) | 87.81 | −4.3 | 14.47 |
| Comp. Z (2 mm w/cell) | 38.04 | 1.23 | −1.72 | Comp. Z (2 mm) | 93.2 | −1.61 | 6.31 |
| Comp. Z (4 mm w/cell) | 38.76 | 2.11 | −4 | Comp. Z (4 mm) | 89.63 | −3.19 | 11.59 |

Wherein L* indicates lightness, a* is the red/green coordinate, and b* is the yellow/blue coordinate. Deltas for L* (ΔL*), a* (Δa*) and b* (Δb*) may be positive (+) or negative (−). From specular component excluded (SCE) color coordination, all the glasses make the PV cell darker, and move the color to less red and less blue. Less blue color is more aesthetically desirable for the appearance when combined with the PV cell.

Figure 1:
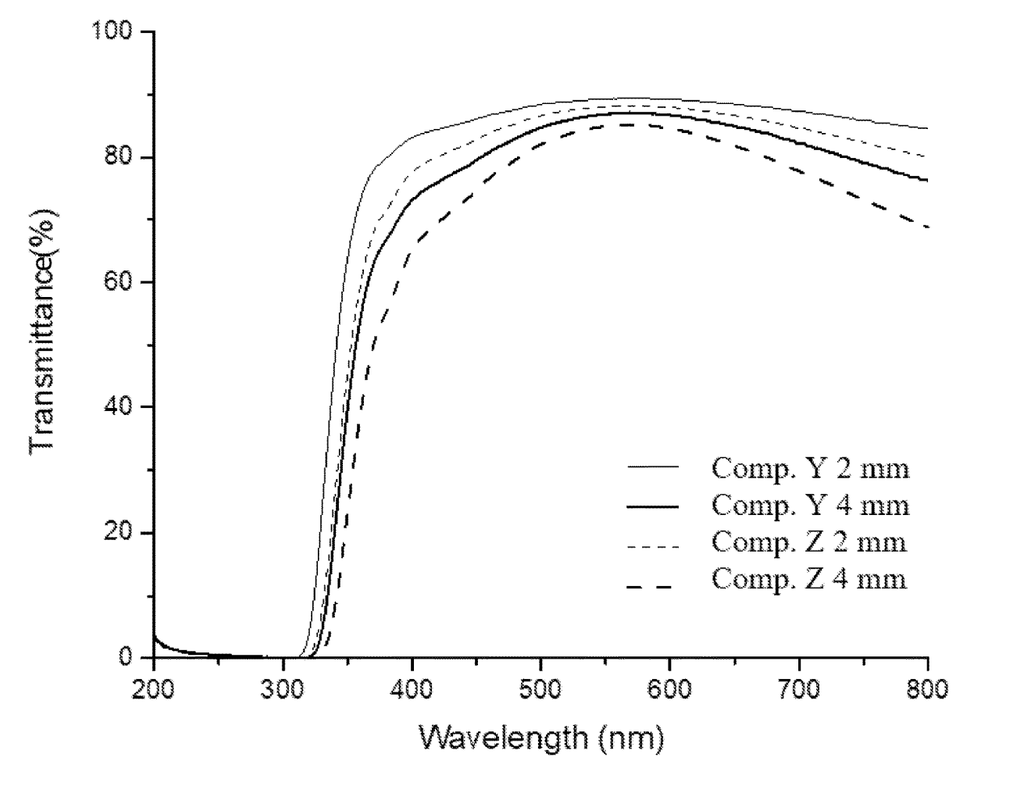
FIG. 1 is a graph of transmittance as a function of wavelength for compositions disclosed herein.

As shown in FIG. 1, the transmittance of visible light (390-700 nm) is above 60% for all glasses and generally over 80% at the center (~550 nm). Generally, solar cells are made out of N-type and P-type semiconductor materials that use the visual light wavelengths of 380 nm to 750 nm to generate electricity. Therefore, these glasses with the embodied color components (e.g, the darkest color, being Comp. Z, 4 mm) won't reduce the efficiency of solar cell significantly.

In some embodiments, the glass can be strengthened to include compressive stress (CS) that extends from a surface thereof to a depth of compression (DOC). The compressive stress regions are balanced by a central portion exhibiting a tensile stress. At the DOC, the stress crosses from a positive (compressive) stress to a negative (tensile) stress.

As an alternative to thermal tempering, the glasses disclosed herein may be ion exchanged by immersion in at least one ion exchange bath containing molten salts (e.g., nitrates, sulfides, halides, or the like) of at least one alkali metal such as lithium, sodium, or potassium. Ion exchange is commonly used to chemically strengthen glasses. In one particular example, alkali cations within a source of such cations (e.g., a molten salt, or "ion exchange," bath) are exchanged with smaller alkali cations within the glass to achieve a layer under a compressive stress (CS) extending from the surface of the glass to a depth of compression (DOC) within the glass phase. For example, potassium ions from the cation source are often exchanged with sodium and/or lithium ions within the glass phase, and the $K^+$ concentration profile correlates with the compressive stress and depth of layer. The ion exchange bath may contain a salt (or salts) of a single alkali metal (e.g., sulfides, nitrates, or halides of Li, Na, or K) or salts of two or more alkali metals (e.g., sulfides, nitrates, or halides of Li and Na, or sulfides, nitrates, or halides of Na and K). Ion exchange is carried out in the ion exchange bath at temperatures ranging from about 390° C. to about 550° C. for times ranging from about 0.5 hour to about 24 hours.

The glass, in some embodiments, is ion exchanged and has a compressive layer extending from a surface to a depth of compression (DOC) of at least about 10 μm or, in some embodiments, at least about 30 μm into the glass, or in some embodiments up to about 10, 15, 20 or 25% into the glass as measured by thickness (surface to center). In some embodiments, the compressive layer extends from the surface of the glass to a depth of up to about 20% of the thickness of the glass. In some embodiments, the glass may be strengthened to exhibit a surface compressive stress in a range from 250 MPa to 800 MPa or greater.

In the strengthened glass, the depth of the compressive layer may be determined by electron microprobe, glow-discharge optical emission spectroscopy (GDOES, which is a technique for measuring depth profiles of constituent elements in a solid sample by detecting emissions from atoms accommodated in plasma by sputtering), or similar techniques that can provide composition data as a function of depth, where data would show incorporation of Na (where $Na^+$ replaces $Li^+$ in the glass phase) and/or K at the surfaces. The DOC of a precursor glass may be measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. CS may also be measured by measured by FSM. As used herein CS may be the "maximum compressive stress" which is the highest compressive stress value measured within the compressive stress layer. In some embodiments, the maximum compressive stress is located at the surface of the glass. In other embodiments, the maximum compressive stress may occur at a depth below the surface, giving the compressive profile the appearance of a "buried peak."

The thermally or chemically strengthened glasses or articles disclosed herein may be incorporated into another article such as an article with a display (or display articles) (e.g., consumer electronics, including mobile phones, tablets, computers, navigation systems, and the like), architectural articles (e.g., windows, skylights, shingles), transportation articles (e.g., automotive, trains, aircraft, sea craft, etc.), appliance articles, or any article that would benefit from transparency, scratch-resistance, abrasion resistance or a combination thereof. In other embodiments, the glass forms a portion of a consumer electronic product, such as a cellular phone or smart phone, laptop computer, tablet, or the like. Such consumer electronic products typically comprise a housing having front, back, and side surfaces, and include electrical components such as a power source, a controller, a memory, a display, and the like, which are at least partially internal to the housing. In some embodiments, the glass described herein comprises at least a portion of a protective element, such as, but not limited to, the housing and/or display of a consumer electronic product.

Processes for Making Glasses

Glasses having the oxide contents listed in Table 1 can be made via traditional methods. For example, in some embodiments, the precursor glasses can be formed by thoroughly mixing the requisite batch materials (for example, using a turbular mixer) in order to secure a homogeneous melt, and subsequently placing into silica and/or platinum crucibles. The crucibles can be placed into a furnace and the glass batch melted and maintained at temperatures ranging from 1250-1650° C. for times ranging from about 6-16 hours. The melts can thereafter be poured into steel molds to yield glass slabs. Subsequently, those slabs can be transferred immediately to an annealer operating at about 500-650° C., where the glass is held at temperature for about 1 hour and subsequently cooled overnight. In another non-limiting example, precursor glasses are prepared by dry blending the appropriate oxides and mineral sources for a time sufficient to thoroughly mix the ingredients. The glasses are melted in platinum crucibles at temperatures ranging from about 1100° C. to about 1650° C. and held at temperature for about 16 hours. The resulting glass melts are then poured onto a steel table to cool. The precursor glasses are then annealed at appropriate temperatures.

Tempering of the embodied glasses was achieved using conventional processes wherein the glasses were heated in a radiant energy furnace or a convection furnace (or a "combined mode" furnace using both techniques) to a predetermined temperature, then gas cooling ("quenching"), typically via convection by blowing large amounts of ambient air against or along the glass surface.

Examples

Embodied glasses can be made as described herein. The properties of Glaverbel soda lime glass (SLG) are compared to the properties of the embodied glasses. Properties of the glasses are shown in Table 1. In addition, the surface compression composition C is compared to Glaverbel SLG for 1 mm thick glass slabs in Table 3. Composition C shows a temperability value of 0.99, approximately 32% higher than SLG and is capable of obtaining a surface compression of 145 MPa vs 105 MPa for SLG under equivalent tempering conditions.

TABLE 2

| Glass | $\psi$ | H (cal/(cm$^2$-s-K)) | $T_0$ (° C.) | Thickness (mm) | Surface Compression (MPa) |
|---|---|---|---|---|---|
| Glaverbel | 0.75 | 0.039 | 690 | 1.05 | 105 |
| Comp. C | 0.99 | 0.039 | 680 | 1.03 | 145 |

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:
1. A glass composition comprising:
60-72 mol % $SiO_2$;
greater than 0 mol % $Al_2O_3$;
greater than 0 mol % MgO;
greater than 0 mol % CaO;
8-16 mol % $Na_2O+K_2O$;
0-16 mol % $Na_2O$;
0-16 mol % $K_2O$;
3-8 mol % ZnO; and
free of $B_2O_3$.
2. The glass composition of claim 1, comprising >0-10 mol % MgO.
3. The glass composition of claim 1, comprising >0-12 mol % $Al_2O_3$.
4. The glass composition of claim 1, comprising >0-15 mol % CaO.
5. The glass composition of claim 1, comprising >0-15 mol % $Na_2O$.
6. The glass composition of claim 1, wherein the glass composition has a low temperature coefficient of thermal expansion (LTCTE) measured at 25° C. and a high temperature coefficient of thermal expansion (HTCTE) measured at 300° C., and wherein the sum of the LTCTE and the HTCTE is $35 \times 10^{-7}$/° C. or greater.
7. The glass composition of claim 6, wherein the sum of the LTCTE and the HTCTE is $37 \times 10^{-7}$/° C. or greater.
8. The glass composition of claim 6, wherein the sum of the LTCTE and the HTCTE is $40 \times 10^{-7}$/° C. or greater.
9. The glass composition of claim 1, wherein the glass composition has a temperability, $\Psi$, and the temperability, $\Psi$, is equal to or greater than 0.80.
10. The glass composition claim 9, wherein the temperability, $\Psi$, is equal to or greater than 0.85.
11. The glass composition claim 9, wherein the temperability, $\Psi$, is equal to or greater than 0.90.
12. A glass composition comprising:
60-72 mol % $SiO_2$;
greater than 0 mol % $Al_2O_3$;
greater than 0 mol % MgO;
greater than 0 mol % CaO;
6-16 mol % $Na_2O+K_2O$;
0-16 mol % $Na_2O$;
0-16 mol % $K_2O$;
3-8 mol % ZnO;
a coloring component; and
free of $B_2O_3$.

13. The glass composition of claim 12, wherein the coloring component comprises $Fe_2O_3$, $V_2O_5$, $Cr_2O_3$, $TiO_2$, $MnO_2$, NiO, ZnO, CuO, NiO, $Co_3O_4$, or combinations thereof.

14. The glass composition of claim 12, wherein the total mol % of coloring components is from 0 to 4 mol %.

15. The glass composition of claim 12, wherein the glass composition exhibits a color presented in SCE color space coordinates with the following values: a*=from about −5 to about −1; b*=from about 5 to about 18; and L*>83.

16. The glass composition of claim 12, wherein the glass composition when rolled into a 2 mm thick slab has a transmission and wherein the transmission is greater than 80% at 575 nm.

17. The glass composition of claim 12, comprising 8-16 mol % $Na_2O+K_2O$.

\* \* \* \* \*

UNITED STATES PATENT AND TRADEMARK OFFICE
CERTIFICATE OF CORRECTION

PATENT NO. : 11,485,673 B2
APPLICATION NO. : 16/640993
DATED : November 1, 2022
INVENTOR(S) : Timothy Michael Gross et al.

Page 1 of 2

It is certified that error appears in the above-identified patent and that said Letters Patent is hereby corrected as shown below:

On the Title Page

In item (56), in Column 2, under "Other Publications", Line 9, delete "Strentth" and insert -- Strength --.

In Column 2, under "Primary Examiner", Line 1, delete "Karle" and insert -- Karl E --.

On the page 4, in Column 1, under "Other Publications", Line 9, delete "Amercian" and insert -- American --.

On the page 4, in Column 1, under "Other Publications", Line 11, delete "Narayan Aswamy;" and insert -- Narayanaswamy; --.

On the page 5, in Column 1, under "Other Publications", Line 5, delete "Dalasheet" and insert -- Datasheet --.

On the page 5, in Column 1, under "Other Publications", Line 11, delete "http:/fwww." and insert -- http://www. --.

On the page 5, in Column 1, under "Other Publications", Line 37, delete "Waxachachie" and insert -- Waxahachie --.

On the page 5, in Column 2, under "Other Publications", Line 25, delete "Writien Opinin" and insert -- Written Opinion --.

On the page 5, in Column 2, under "Other Publications", Line 27, delete "Writien" and insert -- Written --.

On the page 6, in Column 1, under "Other Publications", Line 35, delete "theTool-" and insert -- the Tool- --.

Signed and Sealed this
Eleventh Day of April, 2023

Katherine Kelly Vidal
*Director of the United States Patent and Trademark Office*

CERTIFICATE OF CORRECTION (continued)
U.S. Pat. No. 11,485,673 B2

On the page 6, in Column 2, under "Other Publications", Line 71, delete "Shangdong" and insert -- Shandong --.

On the page 7, in Column 2, under "Other Publications", Line 15, delete ""Themal" and insert -- "Thermal --.

On the page 7, in Column 2, under "Other Publications", Line 19, delete "Sprectroscopy," and insert -- Spectroscopy, --.

In the Claims

In Column 16, Line 53, in Claim 10, delete "composition claim" and insert -- composition of claim --.

In Column 16, Line 55, in Claim 11, delete "composition claim" and insert -- composition of claim --.